(12) United States Patent
Fukuoka et al.

(10) Patent No.: US 12,355,038 B2
(45) Date of Patent: Jul. 8, 2025

(54) BATTERY MODULE, AND METHOD OF MANUFACTURING BATTERY MODULE

(71) Applicant: Envision AESC Japan Ltd., Kanagawa (JP)

(72) Inventors: Manabu Fukuoka, Kanagawa (JP); Masayuki Nakai, Kanagawa (JP); Gen Takayama, Kanagawa (JP); Yuta Motohashi, Kanagawa (JP); Fumio Kishida, Kanagawa (JP); Masahiro Nakamoto, Kanagawa (JP)

(73) Assignee: Envision AESC Japan Ltd., Kanagawa (JP)

( * ) Notice: Subject to any disclaimer, the term of this patent is extended or adjusted under 35 U.S.C. 154(b) by 249 days.

(21) Appl. No.: 16/976,734

(22) PCT Filed: Mar. 30, 2018

(86) PCT No.: PCT/JP2018/013744
§ 371 (c)(1),
(2) Date: Aug. 28, 2020

(87) PCT Pub. No.: WO2019/187043
PCT Pub. Date: Oct. 3, 2019

(65) Prior Publication Data
US 2021/0043981 A1 Feb. 11, 2021

(51) Int. Cl.
*H01M 10/28* (2006.01)
*H01M 50/204* (2021.01)
(Continued)

(52) U.S. Cl.
CPC ....... *H01M 10/281* (2013.01); *H01M 50/204* (2021.01); *H01M 50/211* (2021.01);
(Continued)

(58) Field of Classification Search
CPC .. H01M 10/281; H01M 10/28; H01M 50/204; H01M 50/54; H01M 50/511; H01M 50/591; H01M 50/593; H01M 50/289
See application file for complete search history.

(56) References Cited

U.S. PATENT DOCUMENTS

2011/0151202 A1* 6/2011 Feinstein .................. B32B 7/14
427/532
2012/0070710 A1* 3/2012 Kritzer ................ H01M 10/615
429/100
(Continued)

FOREIGN PATENT DOCUMENTS

CN 204905313 U 12/2015
JP 2015-002264 A 1/2015

OTHER PUBLICATIONS

Chinese Office Action dated Mar. 30, 2022, issued in corresponding Chinese Patent Application No. 201880089935.8 (with English translation).
(Continued)

*Primary Examiner* — Matthew T Martin
*Assistant Examiner* — Adam J Francis
(74) *Attorney, Agent, or Firm* — Morgan, Lewis & Bockius LLP

(57) ABSTRACT

A battery module includes a cell stack in which a plurality of plate-shaped cells is stacked such that each main surface, which is a surface of each of the plate-shaped cells in a cell thickness direction, faces one another.

19 Claims, 21 Drawing Sheets

(51) Int. Cl.
- H01M 50/211 (2021.01)
- H01M 50/291 (2021.01)
- H01M 50/293 (2021.01)
- H01M 50/54 (2021.01)

(52) U.S. Cl.
CPC ....... *H01M 50/291* (2021.01); *H01M 50/293* (2021.01); *H01M 50/54* (2021.01)

(56) References Cited

U.S. PATENT DOCUMENTS

| | | | | |
|---|---|---|---|---|
| 2015/0188185 A1* | 7/2015 | Taylor | ............... | H01M 10/0472 |
| | | | | 429/153 |
| 2015/0303425 A1* | 10/2015 | Kong | ................... | H01M 50/411 |
| | | | | 429/152 |
| 2016/0093849 A1* | 3/2016 | DeKeuster | ........ | H01M 10/0525 |
| | | | | 429/61 |
| 2019/0348650 A1* | 11/2019 | Nakamoto | ........ | H01M 10/0481 |
| 2021/0135313 A1* | 5/2021 | Simon | ................. | H01M 50/209 |

OTHER PUBLICATIONS

International Search Report issued in corresponding International Patent Application No. PCT/JP2018/013744 dated Jun. 26, 2018.
Extended European Search Report issued in counterpart European Patent Application No. 18912160.1 dated Feb. 17, 2021.

\* cited by examiner

BATTERY MODULE, AND METHOD OF MANUFACTURING BATTERY MODULE

TECHNICAL FIELD

The present disclosure relates to a battery module, and a method of manufacturing a battery module.

BACKGROUND

A battery module mounted on a vehicle includes a cell stack in which a plurality of plate-shaped cells is stacked such that main surfaces as surfaces of the respective plate-shaped cells in the cell thickness direction face each other (see Patent Document 1). In a plate-shaped cell, a power generation element formed by stacking electrode plates is accommodated inside an exterior body together with an electrolyte. Electrode terminals are connected to the power generation element inside the exterior body. The electrode terminals are led out of the exterior body. As the distance between the electrode plates of the plate-shaped cell increases, the contact resistance grows large, which leads to a reduction in the cell performance. For this reason, the plate-shaped cell is used while being pressed in the cell thickness direction. In Patent Document 1, the main surface of one plate-shaped cell and the main surface of another plate-shaped cell facing the one plate-shaped cell in the stacking direction are bonded by a pressure-curable adhesive.

PRIOR ART DOCUMENTS

Patent Documents

Patent Document 1: Japanese laid-open publication No. 2015-2264

In the technique disclosed in Patent Document 1, the pressure-curable adhesive is cured after the cell stack is pressed from both sides in the stacking direction with a predetermined pressure. For this reason, the applied pressure-curable adhesive spreads along the main surface during a period from the start of pressing to the curing of the pressure-curable adhesive. The pressure-curable adhesive has a reduced thickness in the unit cell stacking direction. Thus, the pressure applied to the plate-shaped cell, i.e., the reaction force applied from the pressure-curable adhesive to the plate-shaped cell is reduced. As a result, there is a problem that when the battery module is used after curing the pressure-curable adhesive, it is difficult to reliably apply a pressing force to the plate-shaped cell.

The present disclosure provides some embodiments of a battery module capable of reliably applying a pressing force to a plate-shaped cell when using the battery module, and a method of manufacturing a battery module.

SUMMARY

According to one embodiment of the present disclosure for achieving the above aspect, a battery module includes a cell stack in which a plurality of plate-shaped cells is stacked such that a main surface, which is a surface of each of the plate-shaped cells in a cell thickness direction, faces one another. The battery module includes a frame-shaped protruding portion that is formed on a main surface of one plate-shaped cell among the plurality of plate-shaped cells, protrudes from the main surface of the one plate-shaped cell in the cell thickness direction, and is formed in a frame shape that is opened in the cell thickness direction. The battery module includes a filler that fills an inner space of the frame-shaped protruding portion, the inner space being defined by the frame-shaped protruding portion, the main surface of the one plate-shaped cell, and a main surface of another plate-shaped cell facing the one plate-shaped cell in a stacking direction. A volume of the filler, which fills the inner space of the frame-shaped protruding portion, under an atmospheric pressure is larger than a volume of the inner space of the frame-shaped protruding portion in a state in which the cell stack is pressed.

According to another embodiment of the present disclosure for achieving the above aspect, a method of manufacturing a battery module includes preparing a plurality of plate-shaped cells each including a frame-shaped protruding portion, which protrudes from each main surface that is a thickness-direction surface in a thickness direction and is formed in a frame shape opened in the thickness direction. The method of manufacturing the battery module further includes an act of filling, an act of forming a cell stack, and an act of pressing. In the act of filling, a filler that is a fluid having a volume larger than a volume of an inner space of the frame-shaped protruding portion fills the inner space of the frame-shaped protruding portion, the inner space being defined by the frame-shaped protruding portion, a main surface of the one plate-shaped cell, and a main surface of another plate-shaped cell facing the one plate-shaped cell in a stacking direction. In the act of forming the cell stack, a cell stack is formed by stacking the another plate-shaped cell on the one plate-shaped cell having the inner space of the frame-shaped protruding portion filled with the filler such that the main surface faces each other. In the act of pressing, the cell stack is pressed from both sides in the stacking direction. The battery module is manufactured through these acts.

DETAILED DESCRIPTION

Figure 1:
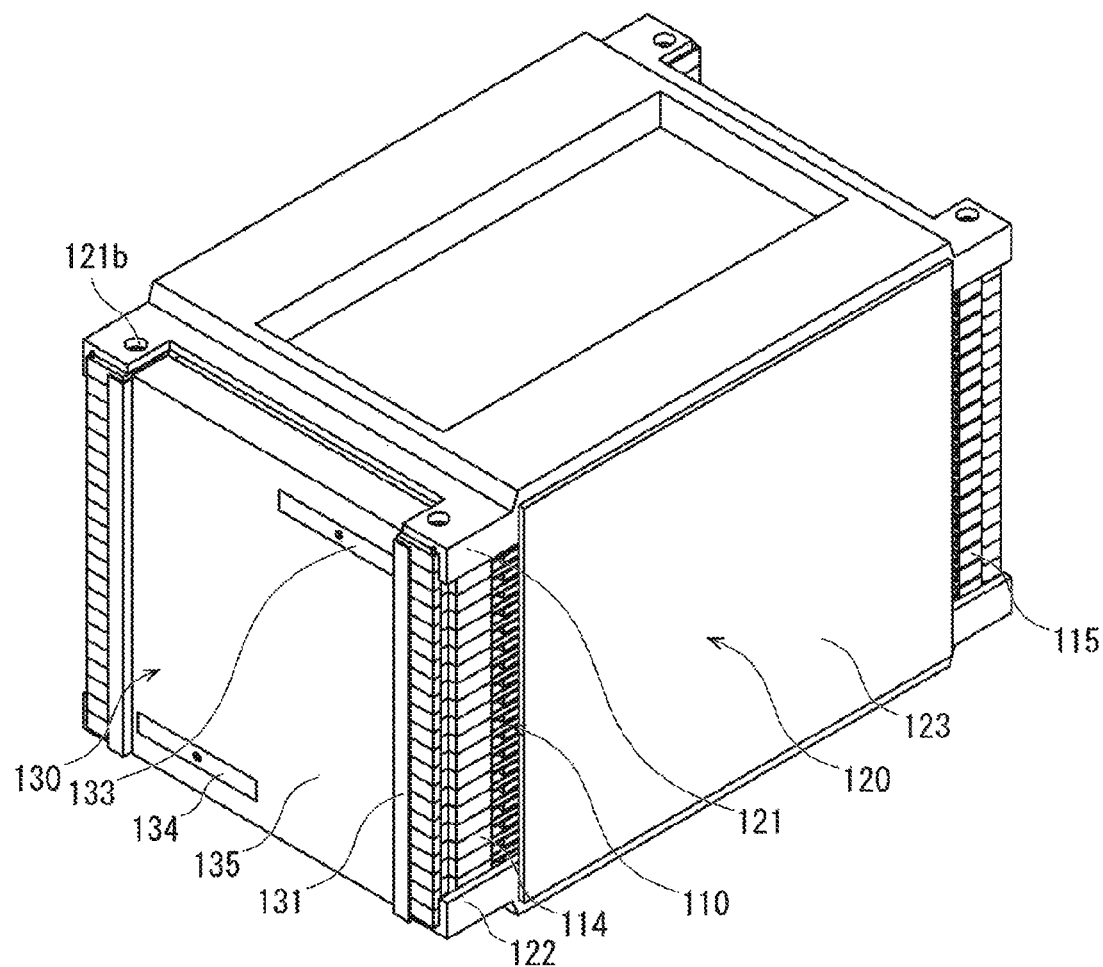
FIG. 1 is a perspective view showing a battery module.

Hereinafter, embodiments of the present disclosure will be described with reference to the accompanying drawings. In the drawings, the same members will be denoted by the same reference numerals, and the redundant description thereof will be omitted. In the drawings, a size or ratio of an individual member may be exaggerated for easy understanding of the embodiments, and may be different from an actual size or ratio.

X-, Y-, and Z-axes shown in the drawings indicate orientations of a battery module 100. The X-axis indicates a direction that intersects a stacking direction of unit cells 110 and extends along a longitudinal direction of the unit cells 110. The Y-axis indicates a direction that intersects the stacking direction of the unit cells 110 (corresponding to plate-shaped cells) and extends along a transverse direction of the unit cells 110. The Z axis indicates the stacking direction of the unit cells 110.

(Battery Module 100)

First, a battery module is described.

Figure 2:
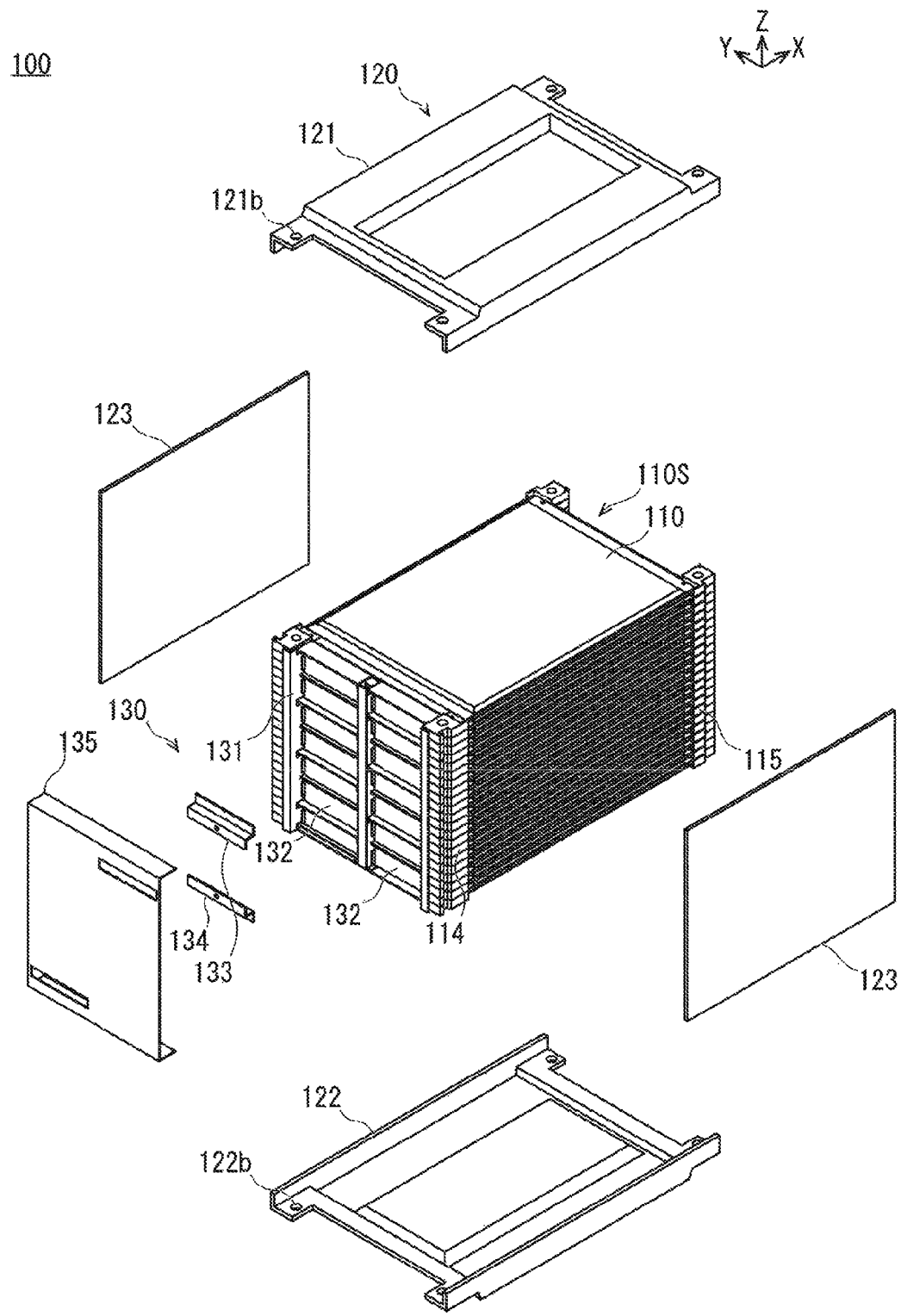
FIG. 2 is a partially-exploded perspective view of the battery module shown in FIG. 1.

Referring to FIGS. 1 and 2, the battery module 100 includes a cell stack 110S formed by stacking a plurality of flat unit cells 110 and a module case 120 configured to accommodate the cell stack 110S. The module case 120 is composed of four plate members, and is also configured to serve as a pressing unit that presses the cell stack 110S. The unit cells 110 are electrically connected by a bus bar unit 130 in a state in which the unit cells 110 are pressed by the module case 120.

Figure 3A:
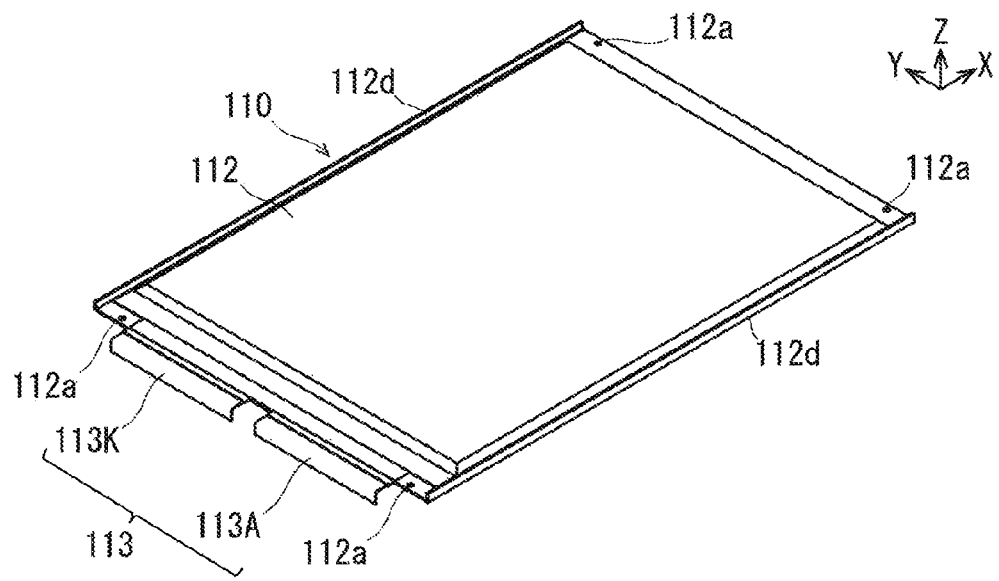
FIG. 3A is a perspective view showing a flat unit cell including electrode terminals.
Figure 3B:
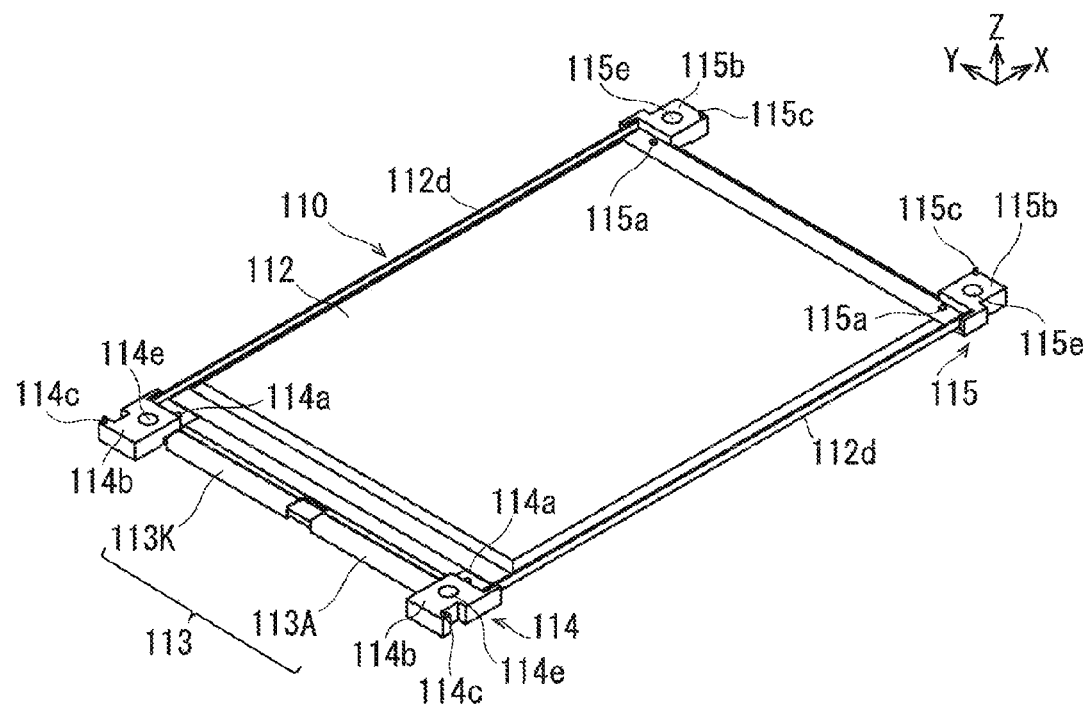
FIG. 3B is a perspective view showing a state where spacers are attached to the unit cell.
Figure 4:
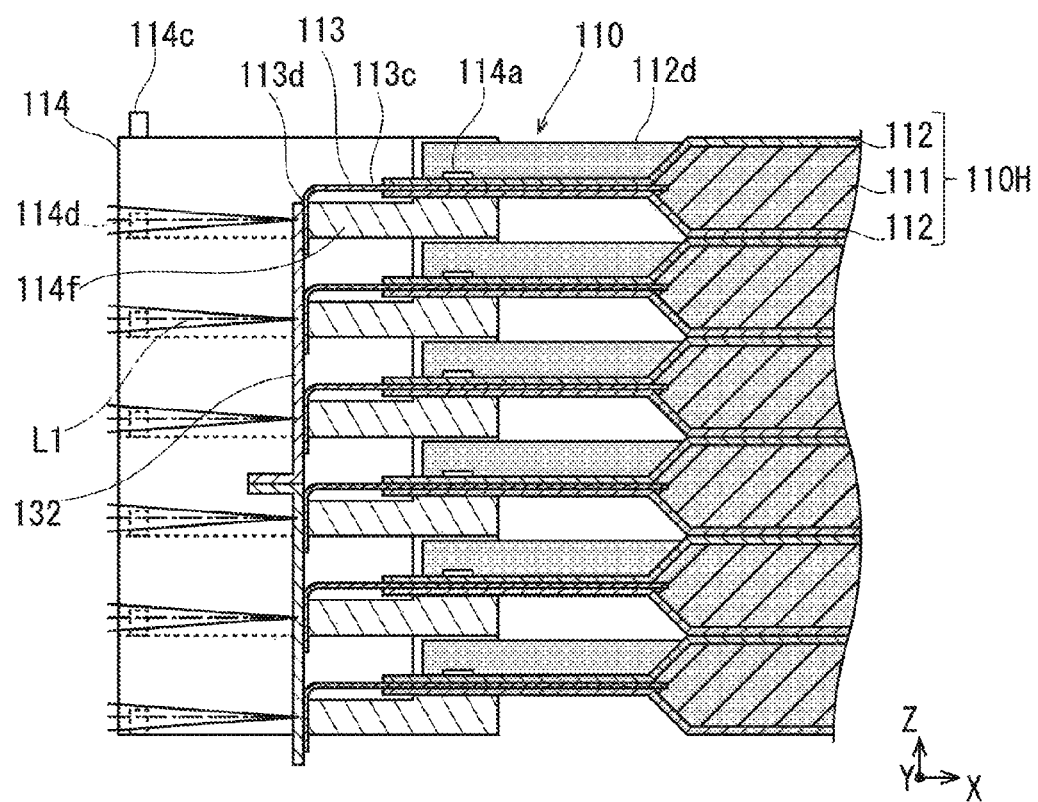
FIG. 4 is a side view showing a cross section of a main part in a state in which bus bars are joined by laser to electrode terminals of stacked unit cells.

Referring to FIGS. 3A, 3B, and 4, the unit cell 110 is, for example, a flat lithium ion secondary battery. The unit cell 110 includes a main body portion 110H in which a power generation element 111 is sealed, for example, by a pair of laminate films 112 as an exterior body, and thin plate-shaped electrode terminals 113. The power generation element 111 is formed by laminating electrode plates, i.e., a positive electrode plate and a negative electrode plate, with a separator interposed therebetween. The power generation element 111 is sealed together with an electrolyte by the laminate films 112. An upper surface and a lower surface of the main body portion 110H correspond to main surfaces of the unit cell 110 (plate-shaped cell) in a cell thickness direction. The cell stack 110S is formed by stacking the unit cells 110 such that the main surfaces of the unit cells 110 face each other (see FIG. 4).

Each laminate film 112 is configured by covering both sides of a metal foil with insulating sheets. Each laminate film 112 includes connection holes 112a formed at its four corners. Each laminate film 112 is formed by bending both of its end portions 112d, which extend along the longitudinal direction X, upward in the laminating direction Z.

The electrode terminal 113 is electrically connected to the power generation element 111 and are led out from the laminate film 112. The electrode terminal 113 includes an anode-side electrode terminal 113A and a cathode-side electrode terminal 113K. Both the anode-side electrode terminal 113A and the cathode-side electrode terminal 113K extend in the longitudinal direction X from one end portion of each laminate film 112 that extends along the transverse direction Y toward one side (the left front side in FIG. 3A).

Each electrode terminal 113 is bent from a base end portion 113c to a distal end portion 113d and formed in an L-shape. The distal end portion 113d of each electrode terminal 113 is formed in a planar shape to face bus bars 132. Each electrode terminal 113 is not limited to the illustrated L-shape, but may have an appropriate shape in relation to the shape of the bus bars 132. The material for forming the anode-side electrode terminal 113A is, for example, aluminum, and the material for forming the cathode-side electrode terminal 113K is, for example, copper.

Referring to FIG. 3B, a side of each unit cell 110 on which the electrode terminal 113 is provided is supported by a pair of first spacers 114, and a side of each unit cell 110 on which the electrode terminal 113 is not provided is supported by a pair of second spacers 115. The unit cells 110 are stacked while being supported by the spacers 114 and 115. Each of the first spacers 114 includes a connection pin 114a inserted into the connection hole 112a of each laminate film 112, and each of the second spacers 115 includes a connection pin 115a inserted into the connection hole 112a. The spacers 114 and 115 are connected to the laminate films 112 by thermally caulking distal ends of the connection pins 114a and 115a. Each of the spacers 114 and 115 is formed of a reinforced plastic having an insulating property.

The respective first spacers 114 include mounting portions 114b at both ends in the longitudinal direction (transverse direction Y), and the respective second spacers 115 include mounting portions 115b at both ends in the longitudinal direction (transverse direction Y). When the unit cells 110 are stacked, the mounting portions 114b of the first spacers 114 adjacent to each other in the stacking direction are in contact with each other, and the mounting portions 115b of the second spacer 115 adjacent to each other in the stacking direction are in contact with each other. Positioning pins 114c and 115c are formed on upper surfaces of the mounting portions 114b and 115b. Positioning holes 114d corresponding to the positions of the positioning pins 114c are formed on lower surfaces of the mounting portions 114b (see FIG. 4). Similarly, positioning holes (not shown) corresponding to the positions of the positioning pins 115c are formed on lower surfaces of the mounting portions 115b. The positions of the mounting portions 114b and 115b are determined by fitting the positioning pins 114c and 115c and the positioning holes 114d. Through holes 114e and 115e through which penetration bolts are inserted are formed in the mounting portions 114b and 115b. As shown in FIG. 4, each first spacer 114 includes a support portion 114f that supports the distal end portion 113d of each electrode terminal 113 from the side opposite to the bus bars 132.

The module case 120 includes an upper pressing plate 121 and a lower pressing plate 122 configured to press the power generation element 111 of each unit cell 110 of the cell stack 110S from above and below, and a pair of side plates 123 configured to fix the upper pressing plate 121 and the lower pressing plate 122 in a state in which they press the cell stack 110S. The upper pressing plate 121 includes a locating hole 121b into which a fastening bolt is inserted to fix the battery module 100 to a pack case (not shown). Similarly, the lower pressing plate 122 includes a locating hole 122b into which a fastening bolt is inserted. The side plates 123 are welded to the upper pressing plate 121 and the lower pressing plate 122. The material for forming the module case 120 is not particularly limited, but may be, for example, stainless steel.

The bus bar unit 130 includes bus bars 132 configured to electrically connect the electrode terminals 113 of the unit cells 110 arranged one above another, a bus bar holder 131 configured to integrally holds the bus bars 132, and a protective cover 135 configured to protect the bus bars 132. The bus bar unit 130 further includes an anode-side terminal 133 configured to allow the anode-side terminals of the plurality of electrically connected unit cells 110 to face external input/output terminals, and a cathode-side terminal 134 configured to allow the cathode-side terminals of the plurality of electrically connected unit cells 110 to face the external input/output terminals.

As shown in FIG. 4, when the bus bars 132 are joined by laser to the electrode terminals 113 of the stacked unit cells, a laser oscillator (not shown) irradiates the bus bars 132 with laser light L1. The bus bars 132 and the distal end portions 113d of the electrode terminals 113 are joined by seam welding or spot welding.

(Structure for Applying Pressing Force to Unit Cells 110 According to First Embodiment)

Next, a structure for applying a pressing force to the unit cells 110 according to a first embodiment is described.

Figure 5A:
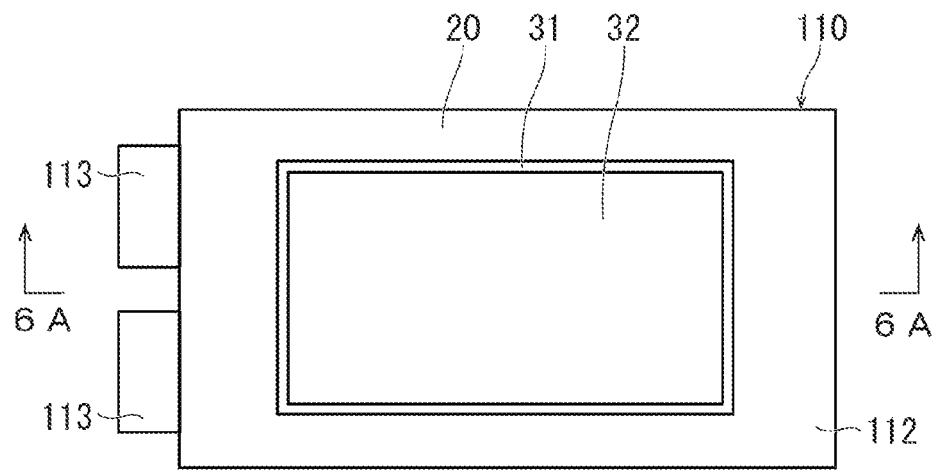
FIG. 5A is a plan view showing a unit cell according to a first embodiment in which a frame-shaped protruding portion is formed on a main surface.
Figure 5B:
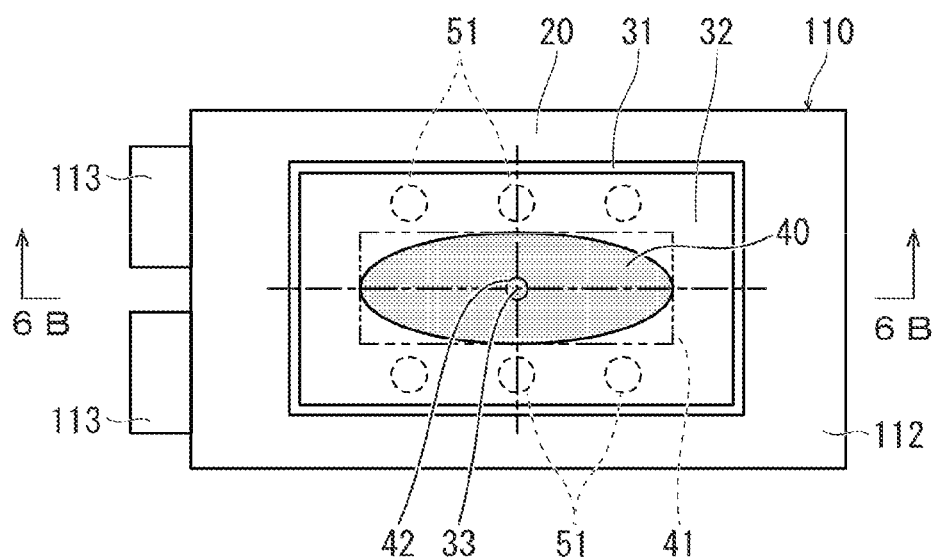
FIG. 5B is a plan view showing a state in which a filler has been applied on the main surface inside the frame-shaped protruding portion, after the state of FIG. 5A.
Figure 5C:
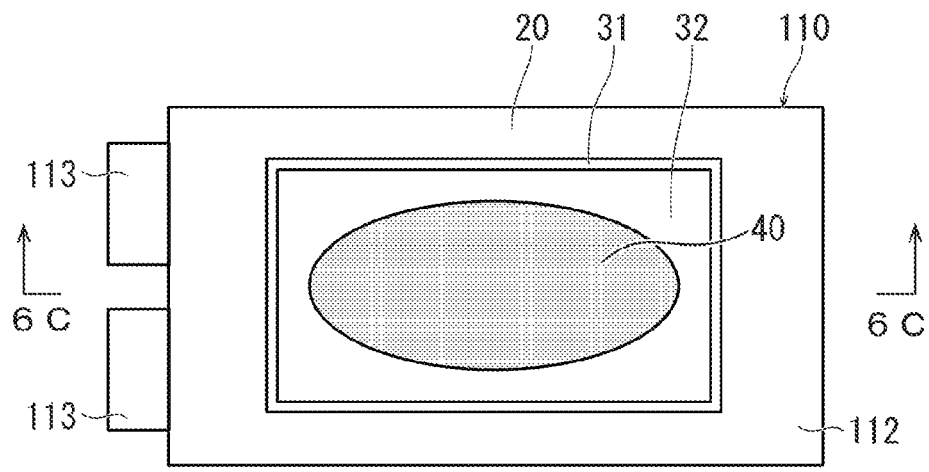
FIG. 5C is a plan view showing a state in which the applied filler has been gradually compressed and spread by stacking unit cells, after the state of FIG. 5B.
Figure 5D:
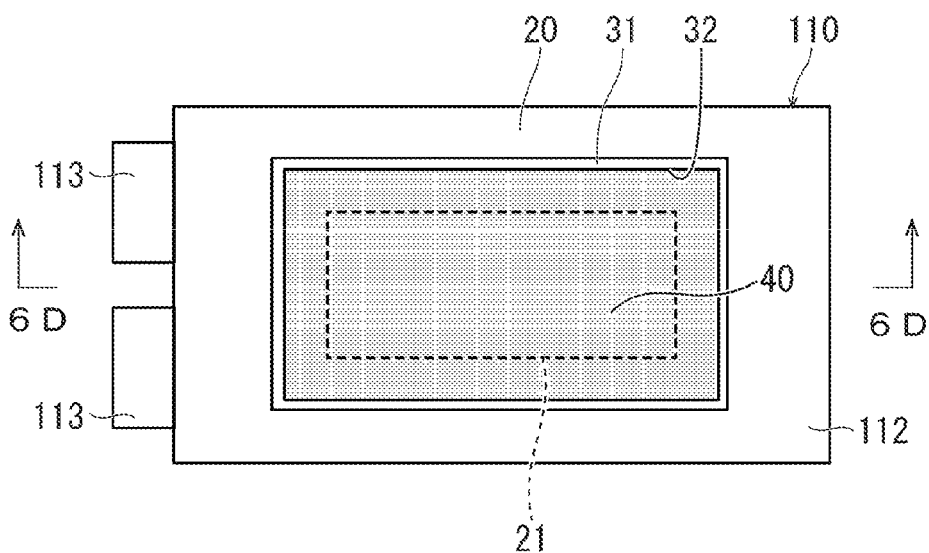
FIG. 5D is a plan view showing a state available after the cell stack has been pressed in the stacking direction, after the state of FIG. 5C.
Figure 6A:
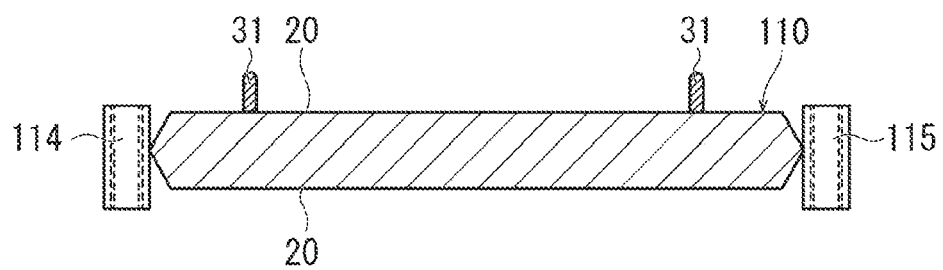
FIG. 6A is a sectional view taken along line 6A-6A in FIG. 5A.
Figure 6B:
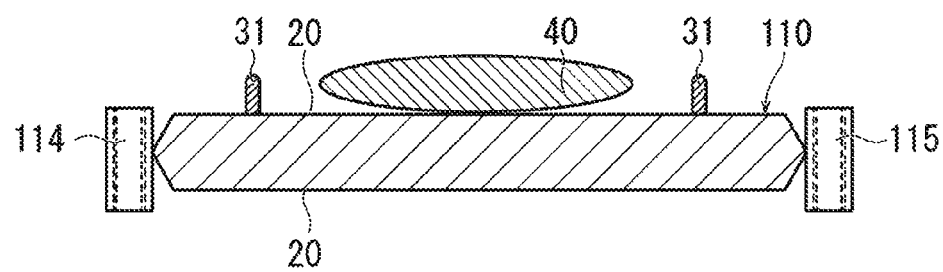
FIG. 6B is a sectional view taken along line 6B-6B in FIG. 5B.
Figure 6C:
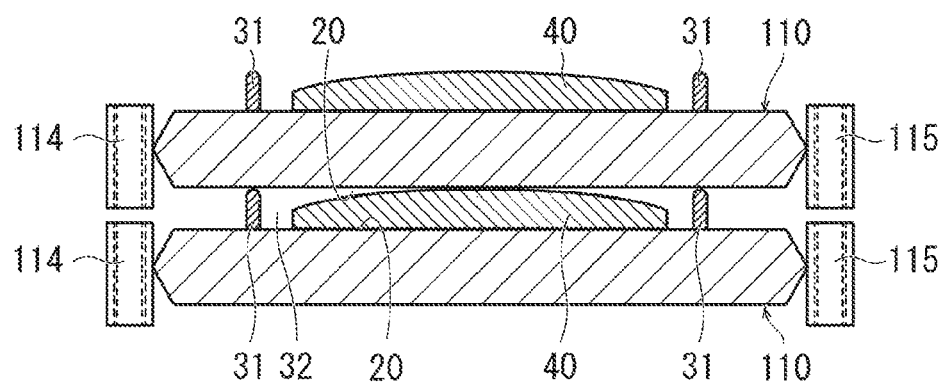
FIG. 6C is a sectional view taken along line 6C-6C in FIG. 5C.
Figure 6D:
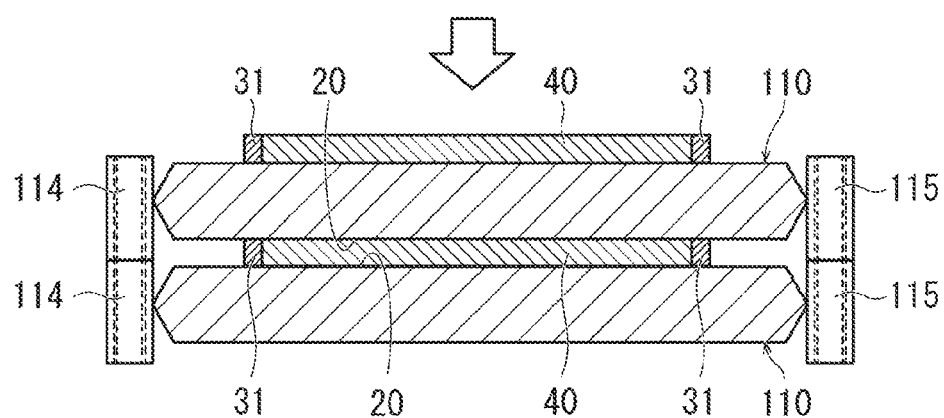
FIG. 6D is a sectional view taken along line 6D-6D in FIG. 5D.

FIG. 5A is a plan view showing the unit cell 110 according to the first embodiment in which a frame-shaped protruding portion 31 is formed on a main surface 20. FIG. 5B is a plan view showing a state in which a filler 40 has been applied on the main surface 20 inside the frame-shaped protruding portion 31, after the state of FIG. 5A. FIG. 5C is a plan view showing a state in which the applied filler 40 has been gradually compressed and spread by stacking the unit cells 110, after the state of FIG. 5B. FIG. 5D is a plan view showing a state in which the cell stack 110S has been pressed in the stacking direction, after the state of FIG. 5C. FIG. 6A is a sectional view taken along line 6A-6A in FIG. 5A. FIG. 6B is a sectional view taken along line 6B-6B in FIG. 5B. FIG. 6C is a sectional view taken along line 6C-6C in FIG. 5C. FIG. 6D is a sectional view taken along line 6D-6D in FIG. 5D.

Referring to FIGS. 5A to 5D and FIGS. 6A to 6D, the battery module 100 is generally described. The battery module 100 includes the cell stack 110S in which the unit cells 110 are stacked so that the main surfaces 20 as the surfaces of the respective unit cells 110 (plate-shaped cells) in the cell thickness direction face each other. The battery module 100 includes the frame-shaped protruding portion 31 that is formed on the main surface 20 of a certain unit cell 110 of the unit cells 110, protrudes from the main surface 20 of the unit cell 110 in the cell thickness direction, and is formed in a frame shape to be opened in the cell thickness direction. The battery module 100 includes a filler 40 that fills the frame-shaped protruding portion's inner space 32, which is defined by the frame-shaped protruding portion 31, the main surface 20 of one unit cell 110, and the main surface 20 of another unit cell 110 facing the one unit cell 110 in the stacking direction. The volume of the filler 40, which fills the frame-shaped protruding portion's inner space 32, under the atmospheric pressure is larger than the volume of the frame-shaped protruding portion's inner space 32 in a state in which the cell stack 110S is pressed. The details are described below.

The unit cell 110 has a substantially rectangular shape with four sides when viewed from the direction of the main surface 20 (the direction orthogonal to the drawing sheet surface in FIGS. 5A to 5D and from above the drawings in FIGS. 6A to 6D). In the unit cell 110, the power generation element 111 formed by stacking electrode plates is accommodated together with an electrolyte inside the laminate films 112 (exterior body). The electrode terminals 113 are connected to the power generation element 111 inside the laminate films 112. The electrode terminals 113 are led out to the outside of the laminate films 112 from one of the four sides (the left side in FIGS. 5A to 5D).

The frame-shaped protruding portion 31 is formed on the main surface 20 of one of the unit cells 110. The frame-shaped protruding portion 31 protrudes from the main surface 20 of the unit cell 110 in the cell thickness direction (see FIGS. 6A to 6D). The frame-shaped protruding portion 31 is formed in a frame shape to be opened in the cell thickness direction. The frame-shaped protruding portion 31 has a substantially rectangular shape having four sides when viewed from the direction of the main surface 20.

The frame-shaped protruding portion 31 has elasticity to be compressed and deformed in the cell thickness direction when the cell stack 110S is pressed from its both sides in the stacking direction. The frame-shaped protruding portion 31 has a function as a dam or a weir that limits a range in which the filler 40 spreads. Therefore, the material for forming the frame-shaped protruding portion 31 may be a material having elasticity and capable of blocking the filler 40 without being passed. For example, the frame-shaped protruding portion 31 may be formed from an elastic material such as sponge, rubber, or resin. The frame-shaped protruding portion 31 including an elastic material may be shaped prior to being formed on the main surface 20.

The frame-shaped protruding portion 31 may be formed, for example, by applying a liquid resin material to the main surface 20 of one unit cell 110 in a frame shape, and then curing the liquid resin material into a gel state. The frame-shaped protruding portion 31 may be easily and continuously formed. Hereinafter, an aspect in which the frame-shaped protruding portion 31 is formed of a liquid resin material will be described.

Since the frame-shaped protruding portion 31 made of the liquid resin material is kept in a gel state even when cured, the frame-shaped protruding portion 31 has elasticity and has an ability to prevent passage of the filler 40. As the liquid resin material, a one-liquid type material which is cured (into a gel state) by UV irradiation, for example, a UV-curable acrylic resin or a quick-drying material may be used. The liquid resin material may or may not contain an adhesive. In the present embodiment, description will be made on, for example, a case where the frame-shaped protruding portion 31 is formed by applying and curing a liquid resin material (into a gel state).

The frame-shaped protruding portion's inner space 32 is defined by the frame-shaped protruding portion 31, the main surface 20 of one unit cell 110, and the main surface 20 of another unit cell 110 facing the one unit cell 110 in the stacking direction (see FIG. 6C). The frame-shaped protruding portion's inner space 32 is a closed space. The volume of the frame-shaped protruding portion's inner space 32 decreases as the cell stack 110S is pressed (see FIG. 6D).

The volume of the filler 40, which fills the frame-shaped protruding portion's inner space 32, under the atmospheric pressure is larger than the volume of the frame-shaped protruding portion's inner space 32 in a state where the cell stack 110S is pressed. When the filling of the filler 40 is performed, the volume of the frame-shaped protruding portion's inner space 32 before compression (having a state in FIG. 6C) is a reference, and the filling is performed with the filler 40 as a fluid having a volume equal to or greater than the volume of the frame-shaped protruding portion's inner space 32 before compression.

The frame-shaped protruding portion 31 has a function of limiting a range in which the filler 40 spreads. By setting the volume relationship as described above, the filler 40 after the filling may generate a pressing force against the unit cell 110, i.e., a reaction force applied to the unit cell 110 from the filler 40, in the frame-shaped protruding portion's inner space 32.

The fluid filling the frame-shaped protruding portion's inner space 32 may be a plastic fluid (Bingham fluid). The Bingham fluid is a fluid that does not begin to flow unless a certain shear stress is reached. Therefore, an initial surface pressure may be easily generated by pressing. As the filler 40, a two-liquid reactive acrylic anaerobic resin may be used. The filler 40 may or may not contain an adhesive. The frame-shaped protruding portion 31 limits the spread of the filler 40. The fluid, which fills the frame-shaped protruding portion's inner space 32 may be a Newtonian fluid with or without an adhesive. The fluid may be either a two-liquid mixed type or a one-liquid type.

As shown in FIG. 5D, the position of the frame-shaped protruding portion 31 is located outside a cell-pressing projection region 21.

Since the cell-pressing projection region 21 is filled with the filler 40, the unit cell 110 does not have a large distance between the electrode plates constituting the power generation element 111, and does not cause a decrease in cell performance.

(Method of Manufacturing Battery Module 100)

When stacking the unit cells 110, cell assemblies obtained by connecting the spacers 114 and 115 to the unit cells 110 are stacked. In FIGS. 5A to 5D, the illustration of the spacers 114 and 115 is omitted. The stacking of the cell assemblies may be performed by a robot (not shown). The robot includes a suction pad for holding each of the cell assemblies by vacuum suction.

First, as shown in FIGS. 5A and 6A, the plurality of unit cells 110 including the frame-shaped protruding portions 31 protruding in the thickness direction from the main surfaces 20 as thickness-direction surfaces and formed in a frame shape to be opened in the thickness direction is prepared. The frame-shaped protruding portion 31 is formed by applying a liquid resin material to the main surface 20 of one unit cell 110 in a frame shape and then curing the liquid resin material. For example, a UV-curable acrylic resin is applied in a frame shape and cured (into a gel state) by UV irradiation, thereby forming the frame-shaped protruding portion 31.

As shown in FIG. 5B, the filler 40 is elliptically applied onto the main surface 20 inside the frame-shaped protruding portion 31. In this process, a center 33 of a range of a region that is surrounded by the frame-shaped protruding portion 31, i.e., the range in which the filler 40 spreads, is preferably aligned with a center 42 of a virtual rectangular region 41 (indicated by a two-dot chain line in FIG. 5B) that circumscribes the applied filler 40. When the cell stack 110S is pressed in the stacking direction, the filler 40 does not biasedly spread and may be prevented from climbing over the frame-shaped protruding portion 31.

As shown in FIGS. 5C and 6C, the frame-shaped protruding portion's inner space 32 is filled with the filler 40 as a fluid having a larger volume than the volume of the frame-shaped protruding portion's inner space 32 (filling step). The fluid, which fills the frame-shaped protruding portion's inner space 32 in the filling step may be a plastic fluid (Bingham fluid). Since the Bingham fluid is a fluid that does not begin to flow unless a certain shear stress is reached, an initial surface pressure may be easily generated by pressing. The filler 40 is, for example, a two-liquid reactive acrylic anaerobic resin.

The robot sucks and holds an upper cell assembly, transfers the upper cell assembly onto a lower cell assembly, and stacks the upper cell assembly on the cell assembly in an aligned state. Circles indicated by reference numeral 51 indicate areas sucked and held by the robot (see FIG. 5B). The robot slightly pushes down the upper cell assembly toward the lower cell assembly to slightly spread the applied filler 40. The pressed portions are the same locations as the suction areas. The filler 40 is compressed to spread to such an extent that the filler 40 comes into contact with the frame-shaped protruding portion 31. Such compression is referred to as smoothing compression. At the time of smoothing compression, a gap exists between the spacers 114 and 115 adjoining in the stacking direction (see FIG. 6C).

Another unit cell 110 is stacked on one unit cell 110 in which the filler 40 fills the frame-shaped protruding portion' inner space 32, thereby forming a cell stack 110S such that the main surfaces 20 are opposed to each other.

The cell stack 110S is sandwiched between the upper pressing plate 121 and the lower pressing plate 122, and is pressed from both sides in the stacking direction (pressing step).

As shown in FIGS. 5D and 6D, by pressing the cell stack 110S, the frame-shaped protruding portion 31 is compressed and deformed in the cell thickness direction, and the spacers 114 and 115 adjoining in the stacking direction are brought into close contact with each other. The pressing force applied in this process is received as the metal collars incorporated in the through holes 114e and 115e of the spacers 114 and 115 come into contact with each other. The frame-shaped protruding portion 31 has a function of, when compressed, limiting a range in which the filler 40 spreads. The filler 40 after the filling generates a pressing force against the unit cell 110, i.e., a reaction force applied to the unit cell 110 from the filler 40, in the frame-shaped protruding portion's inner space 32, which is a closed space. After the cell stack 110S is produced, the filler 40 is cured (into a gel state). When the filler 40 is cured, its spreading has already been completed. Thus, the thickness of the filler 40 in the unit cell stacking direction does not decrease. For this reason, the reaction force from the filler 40 to the unit cell 110 does not decrease. As a result, when the battery module 100 is used, the pressing force is reliably applied to the unit cell 110.

The filler 40 may or may not have an adhesive function. However, the filler 40 may be an adhesive for bonding the main surface 20 of one unit cell 110 to the main surface 20 of another unit cell 110. In the manufacturing method used in this case, the fluid filled in the frame-shaped protruding portion's inner space 32 in the filling step is an adhesive which is cured after the pressing step to bond the main surface 20 of one unit cell 110 to the main surface 20 of another unit cell 110.

This makes it possible to secure an area required for an adhesive layer.

The frame-shaped protruding portion 31 may or may not contain an adhesive. The material for forming the frame-shaped protruding portion 31 may be an adhesive for bonding the main surface 20 of one unit cell 110 to the main surface 20 of another unit cell 110.

This makes it possible to secure an area required for an adhesive layer.

In addition to applying the pressing force to the unit cells 110, the unit cells 110 engaging with each other in the stacking direction may be joined via an adhesive. The unit cells 110 may be stacked while maintaining the positions of the unit cells 110 with high accuracy. Thus, the positions of the electrode terminals 113 and the positions of the bus bars 132 may be managed in a manner that no gap is formed between the electrode terminals 113 and the bus bars 132. As a result, as the electrode terminals 113 and the bus bars 132 are laser-welded, it is possible to secure a high welding.

(Modification of Application Form of Filler 40)

Figure 7A:
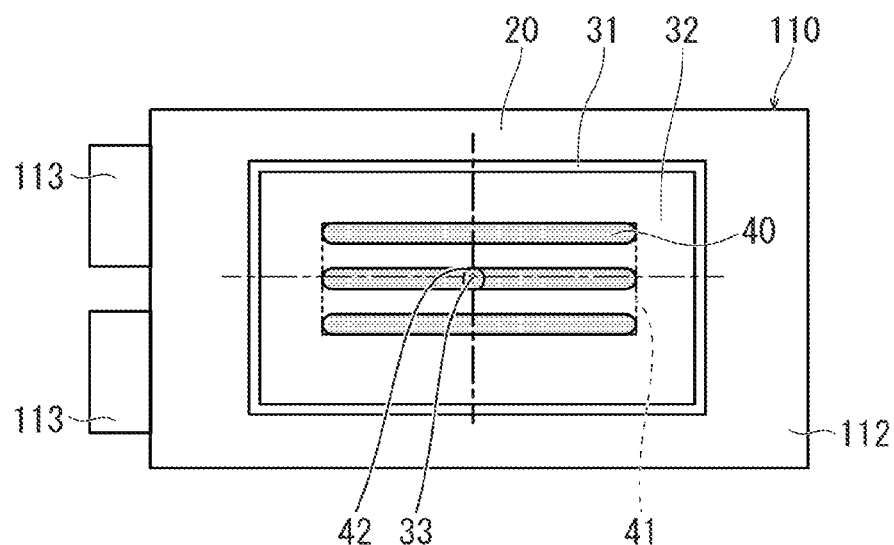
FIG. 7A is a plan view showing a modification of a filler application form.
Figure 7B:
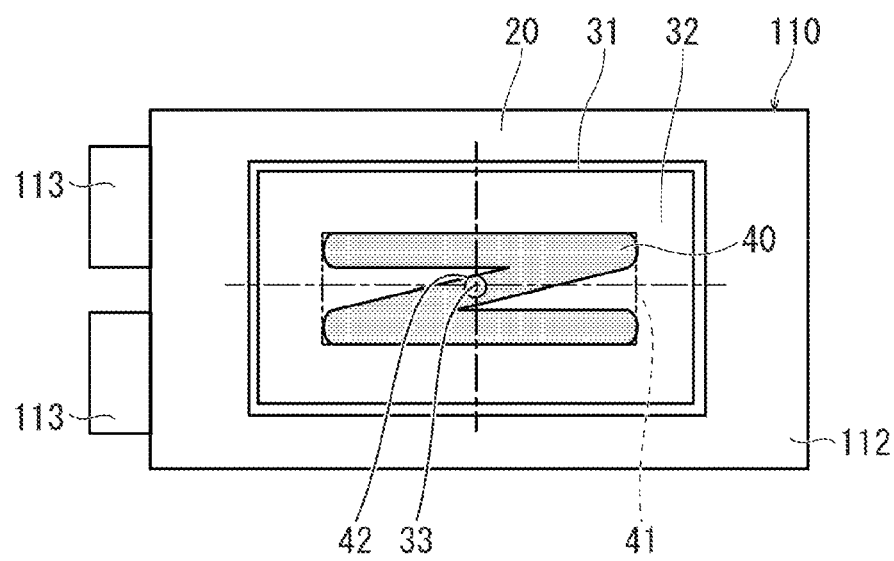
FIG. 7B is a plan view showing another modification of the filler application form.
Figure 7C:
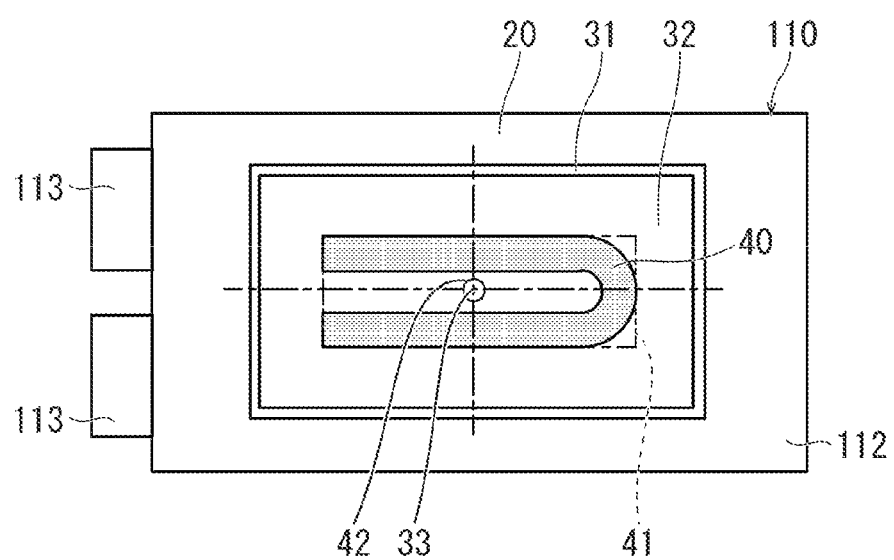
FIG. 7C is a plan view showing still another modification of the filler application form.

FIGS. 7A, 7B, and 7C are plan views showing modifications of the application form of the filler 40.

The plan-view shape when applying the filler 40 is not limited to the elliptical shape shown in FIG. 5B.

As shown in FIG. 7A, the filler 40 may be divided into three linear pieces to be applied. As shown in FIG. 7B, the filler 40 may be applied in an "N" shape when viewed from the right side of the drawing sheet surface. Furthermore, as shown in FIG. 7C, the filler 40 may be applied in a "U" shape when viewed from the right side of the drawing sheet surface. In any case, as shown in FIG. 5B, the center 33 of the range of the region surrounded by the frame-shaped protruding portion 31, i.e., the range in which the filler 40 spreads, is preferably aligned with the center 42 of the virtual rectangular region 41 (indicated by a two-dot chain) circumscribing the applied filler 40.

When the cell stack 110S is pressed in the stacking direction, the filler 40 does not biasedly spread and may be prevented from climbing over the frame-shaped protruding portion 31.

(Modification of Shape of Frame-Shaped Protruding Portion 31 According to First Embodiment)

Figure 8A:
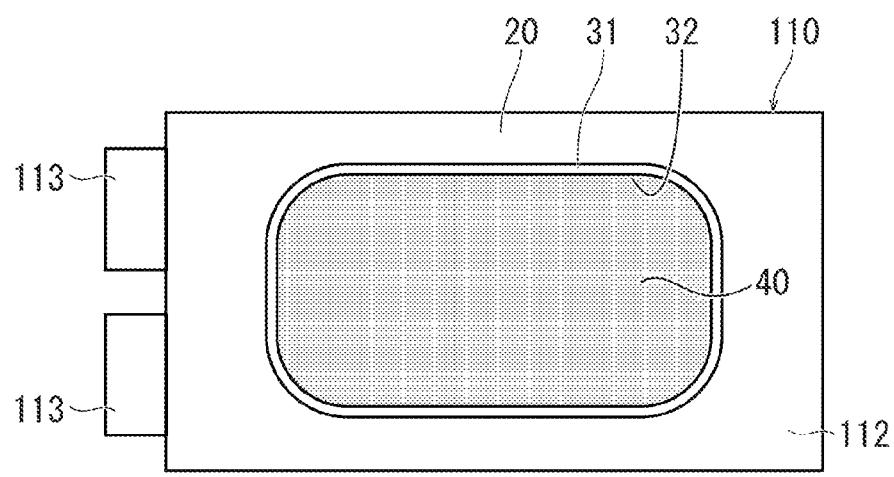
FIG. 8A is a plan view showing a modification of the shape of the frame-shaped protruding portion according to the first embodiment.
Figure 8B:
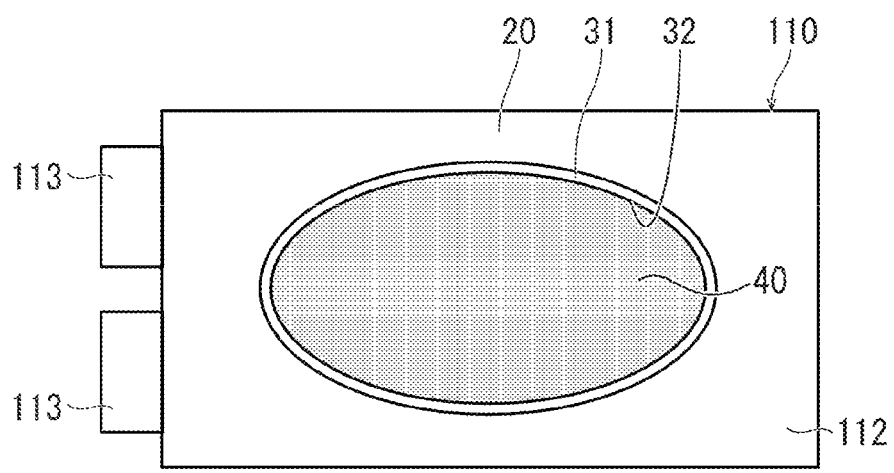
FIG. 8B is a plan view showing another modification of the shape of the frame-shaped protruding portion according to the first embodiment.

FIGS. 8A and 8B are plan views showing modifications of the shape of the frame-shaped protruding portion 31.

The shape of the frame-shaped protruding portion 31 is not limited to the rectangular shape shown in FIGS. 5A to 5D.

As shown in FIG. 8A, the frame-shaped protruding portion 31 may be formed by four protruding portions each having a linear shape when viewed from the direction of the main surface 20, and at least both ends of each of the four protruding portions may formed into a curved shape. That is, the four corners of the rectangle may be formed into an arc shape.

In the case of the frame-shaped protruding portion 31 having a rectangular shape, if the dimensions in the long side direction and the short side direction are significantly different, the timings at which the filler 40 makes contact with the frame-shaped protruding portion 31 in the long side direction and the short side direction differ from each other. For this reason, there is a possibility that a part of the filler 40 first making contact with the frame-shaped protruding portion 31 may climb over the frame-shaped protruding portion 31 and may overflow, which results in the frame-shaped protruding portion 31 failing to contain the filler 40. By forming the four corners of the rectangle into an arc shape, the filler 40 may first make contact with the long side portion of the frame-shaped protruding portion 31 along the short side direction, and then change its spreading direction to evenly spread throughout the inside of the frame-shaped protruding portion 31. This makes it possible to prevent the filler 40 from locally making contact with the frame-shaped protruding portion 31, and to uniformly fill the frame-shaped protruding portion's inner space 32 with the filler 40.

In addition, as shown in FIG. 8B, the frame-shaped protruding portion 31 may be formed by a protruding portion having an elliptical shape when viewed from the direction of the main surface 20.

Since the elliptical shape does not have a linear portion, the filler 40 may first make contact with the frame-shaped protruding portion 31, and then change its spreading direction to spread more evenly over the entire region inside the frame-shaped protruding portion 31. This makes it possible to prevent the filler 40 from locally making contact with the frame-shaped protruding portion 31, and to uniformly fill the frame-shaped protruding portion's inner space 32 with the filler 40.

(Structure for Applying Pressing Force to Unit Cell 110 According to Second Embodiment)

Next, a structure for applying a pressing force to the unit cell 110 according to a second embodiment will be described.

Figure 9A:
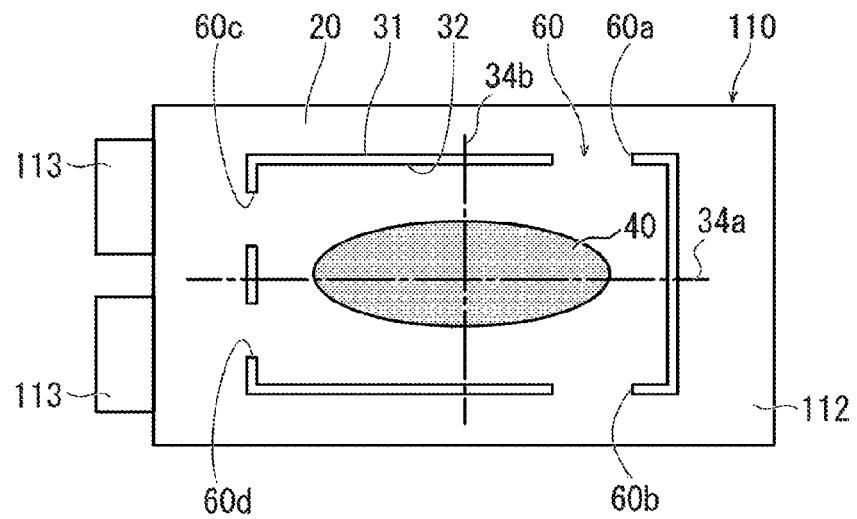
FIG. 9A is a plan view showing a unit cell according to a second embodiment, in which a frame-shaped protruding portion is formed on a main surface with the filler applied onto the main surface inside the frame-shaped protruding portion.
Figure 9B:
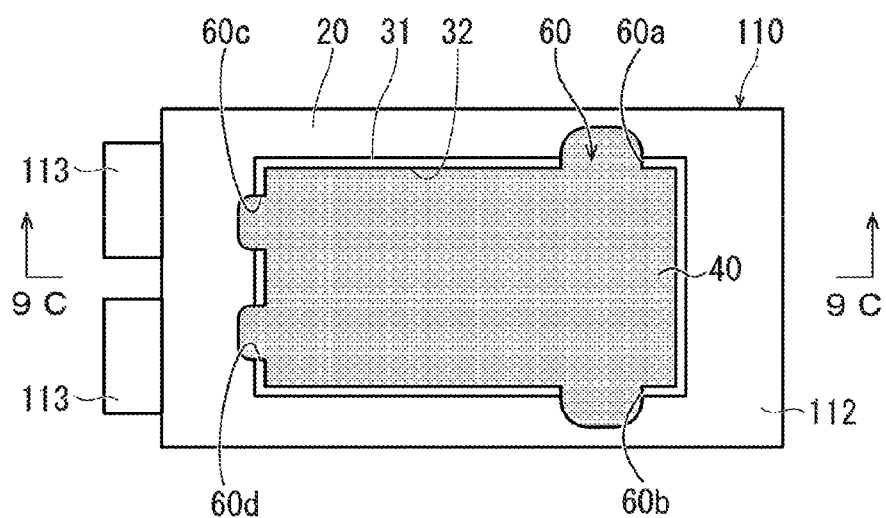
FIG. 9B is a plan view showing a state in which the cell stack has been pressed in the stacking direction.
Figure 9C:
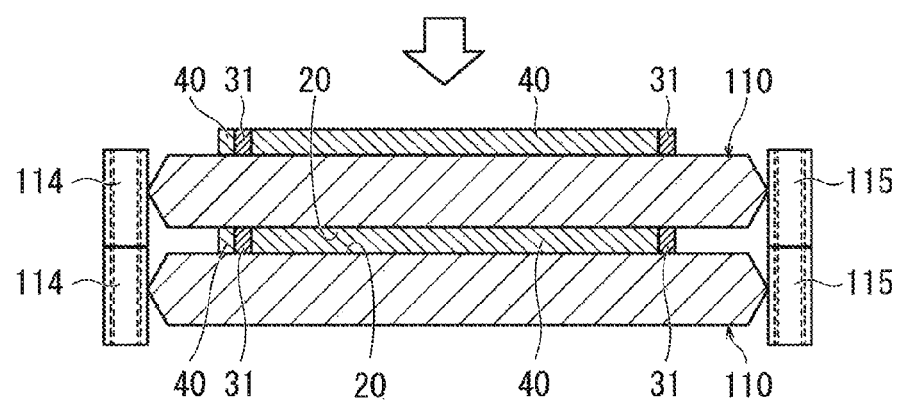
FIG. 9C is a sectional view taken along line 9C-9C in FIG. 9B.

FIG. 9A is a plan view showing a unit cell according to a second embodiment, in which the frame-shaped protruding portion 31 is formed on the main surface 20 with the filler 40 applied onto the main surface 20 inside the frame-shaped protruding portion 31. FIG. 9B is a plan view showing a state in which the cell stack 110S has been pressed in the stacking direction. FIG. 9C is a sectional view taken along line 9C-9C in FIG. 9B.

Referring to FIGS. 9A to 9C, the battery module 100 according to the second embodiment is generally described. The battery module 100 includes a frame-shaped protruding portion 31 at which communication holes 60 are provided to be opened in the direction parallel to the main surface 20 to bring the frame-shaped protruding portion's inner space 32 into communication with the outside of the frame-shaped protruding portion 31.

The frame-shaped protruding portion 31 is formed by intermittently applying a liquid resin material to the main surface 20 of one unit cell 110 in a frame shape and then curing the liquid resin material. By intermittently applying the liquid resin material for the frame-shaped protruding portion 31, the communication holes 60 may be formed with ease. As shown in FIG. 9A, a plurality of communication holes 60, e.g., four communication holes in the illustrated example, are provided. A first communication hole 60a is formed on an upper side of the frame-shaped protruding portion 31, and a second communication hole 60b is formed on a lower side of the frame-shaped protruding portion 31. A third communication hole 60c and a fourth communication hole 60d are formed on a left side of the frame-shaped protruding portion 31. The first communication hole 60a and the second communication hole 60b have the same opening width, and are formed at positions facing each other. The third communication hole 60c and the fourth communication hole 60d have the same opening width. The opening width of the third communication hole 60c and the fourth communication hole 60d is smaller than the opening width of the first communication hole 60a and the second communication hole 60b. The surface pressure applied to the main surface 20 of the unit cell 110 may be adjusted by the opening width of the communication holes 60.

Since there are some variations in the thickness of the main body portion of the unit cell 110, some variations occur in the gap between the opposing main surfaces 20. When the gap between the opposing main surfaces 20 (which is the height of the frame-shaped protruding portion's inner space 32) is smaller than a designed gap, the reaction force applied to the unit cell 110 by the filler 40, which fills the frame-shaped protruding portion's inner space 32, may become too large.

As shown in FIGS. 9B and 9C, in such a case, after the filler 40 fills the frame-shaped protruding portion's inner space 32, the excess filler 40 escapes from the frame-shaped protruding portion's inner space 32 to the outside of the frame-shaped protruding portion 31 through the communication holes 60.

In the second embodiment, similarly to the first embodiment, a pressing force against the unit cell 110, i.e., a reaction force applied from the filler 40 to the unit cell 110 is generated in the frame-shaped protruding portion's inner space 32. After the cell stack 110S is produced, the filler 40 is cured (into a gel state). In the process of curing the filler 40, the spreading of the filler 40 has already been completed, and the thickness of the filler 40 in the unit cell stacking direction does not decrease. Therefore, the reaction force from the filler 40 to the unit cell 110 does not decrease. As a result, when the battery module 100 is used, the pressing force is reliably applied to the unit cell 110.

Furthermore, by providing the communication holes 60, the initial surface pressure may be suppressed to a low level at the initial stage of pressing the cell stack 110S, and the unit cells 110 are prevented from being damaged.

The filler 40 may be a plastic fluid (Bingham fluid), which is a fluid that does not begin to flow unless a certain shear stress is reached. For this reason, even if the excess filler 40 escapes, the filler 40 remaining in the frame-shaped protruding portion's inner space 32 sufficiently generates a reaction force applied from the filler 40 to the unit cell 110.

The reason for using the term "initial surface pressure" is that in a steady state after a lapse of time, the pressure in the frame-shaped protruding portion's inner space 32 becomes uniform at any portion due to the principle of Pascal, but the pressure difference transiently fluctuates at the initial pressing stage.

The opening widths of the communication holes 60 may be based on an experimental result in consideration of a required surface pressure, a surface pressure adjustable range, and the like, without being uniquely determined.

The communication holes 60 may be formed at symmetrical positions with respect to straight lines 34a and 34b extending in the direction parallel to the main surface 20 through the center 33 of the region surrounded by the frame-shaped protruding portion 31 (see FIG. 9A). The first communication hole 60a and the second communication hole 60b are formed at symmetrical positions with respect to the straight line 34a extending in the direction parallel to the main surface 20 through the center 33. The third communication hole 60c and the fourth communication hole 60d are also are formed at symmetrical positions with respect to the straight line 34a extending in the direction parallel to the main surface 20 through the center 33. By allowing the excess filler 40 to escape from the symmetrically-arranged communication holes 60, a uniform surface pressure may be applied to the unit cell 110.

In addition, due to the presence of the communication holes 60, there is no concern that when the filler 40 is caused to spread, a gas such as an air or the like enters the frame-shaped protruding portion's inner space 32.

(Modification of Shape of Frame-Shaped Protruding Portion 31 According to Second Embodiment)

Figure 10A:
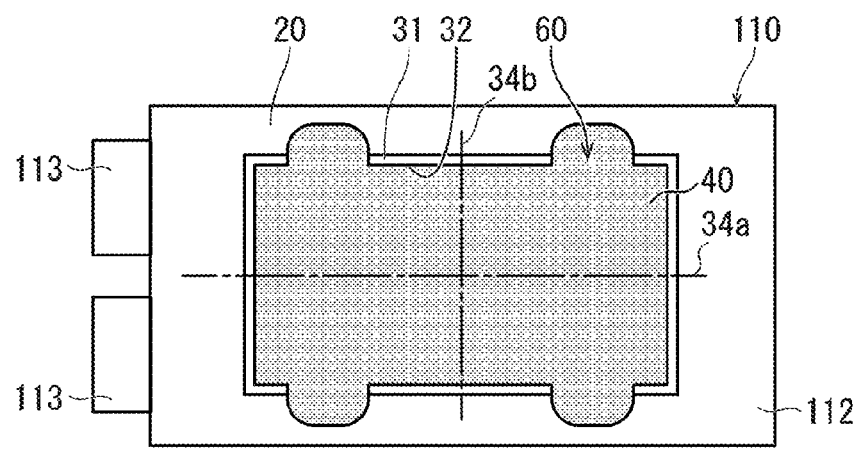
FIG. 10A is a plan view showing a modification of the shape of the frame-shaped protruding portion according to the second embodiment.
Figure 10B:
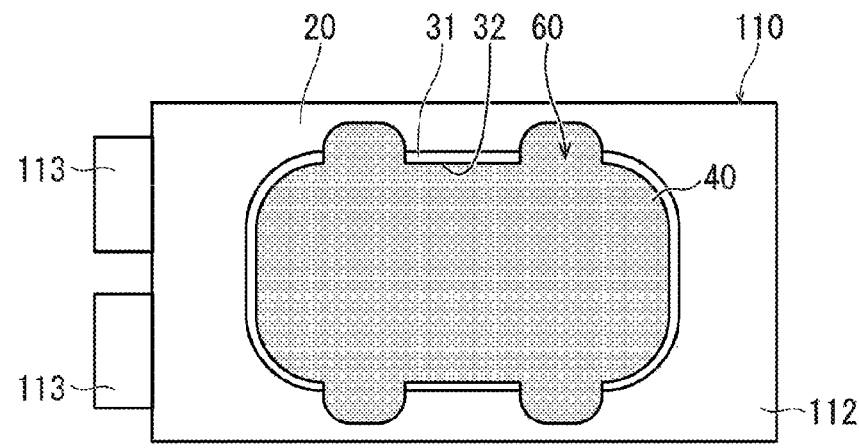
FIG. 10B is a plan view showing another modification of the shape of the frame-shaped protruding portion according to the second embodiment.
Figure 10C:
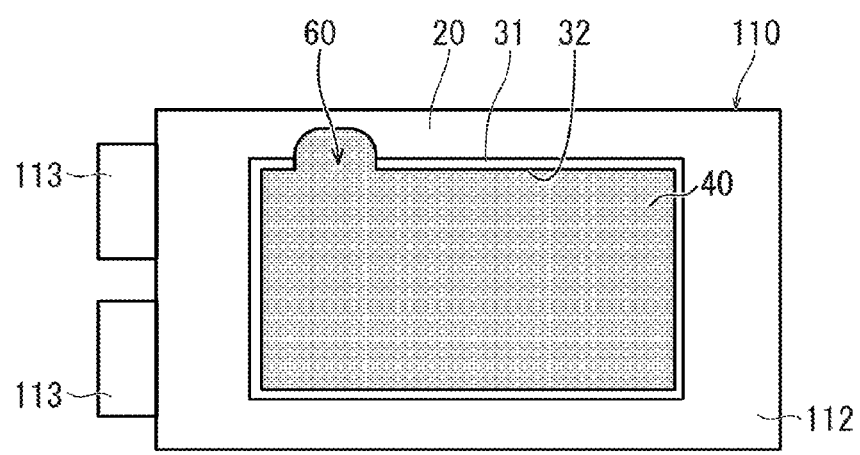
FIG. 10C is a plan view showing still another modification of the shape of the frame-shaped protruding portion according to the second embodiment.

FIGS. 10A, 10B, and 10C are plan views showing modifications of the shape of the frame-shaped protruding portion 31.

The shape of the frame-shaped protruding portion 31 is not limited to the shapes shown in FIGS. 9A and 9B.

Referring to FIG. 10A, similarly to the first and second embodiments, the unit cell 110 of the modification has a substantially rectangular shape with four sides when viewed from the direction of the main surface 20 (the direction orthogonal to the drawing sheet surface in FIG. 10A). In the unit cell 110, the power generation element 111 formed by stacking electrode plates is accommodated together with an electrolyte inside the laminate films 112 (exterior body). The electrode terminals 113 are connected to the power generation element 111 inside the laminate films 112. The electrode terminals 113 are led out to the outside of the laminate films 112 from one of the four sides (i.e., the left side in FIG. 10A). Communication holes 60 are opened toward a side that is not a side from which the electrode terminals 113 are led out (i.e., the left side in FIG. 10A). The communication holes 60 do not face the electrode terminals 113. Therefore, the distance between the electrode terminals 113 and the communication holes 60 increases. As a result, it is possible to prevent the filler 40 escaped through the communication holes 60 from adhering to the electrode terminals 113.

Referring to FIG. 10B, 5 similarly to the frame-shaped protruding portion 31 shown in FIG. 8A, the unit cell 110 of another modification has a shape in which four corners of a rectangle are formed in an arc shape. In the unit cell 110, communication holes 60 are formed in the frame-shaped protruding portion 31 having the foregoing shape. The excess filler 40 changes its spreading direction at the corner portions of the arc shape and easily escapes to the outside of the frame-shaped protruding portion 31 through the communication holes 60. As a result, at the initial stage of pressing the cell stack 110S, the initial surface pressure is easily reduced.

Referring to FIG. 10C, the unit cell 110 of still another modification has only one communication hole 60. The number of communication hole 60 is not limited to a plurality of communication holes. The number of communication hole 60 may be determined from the viewpoint of allowing the excess filler 40 to escape and imparting a uniform surface pressure to the unit cell 110, and may be only one or may be five or more.

(Structure for Applying Pressing Force to Unit Cells 110 According to Third Embodiment)

Next, a structure for applying a pressing force to the unit cells 110 according to the third embodiment is described.

Figure 11A:
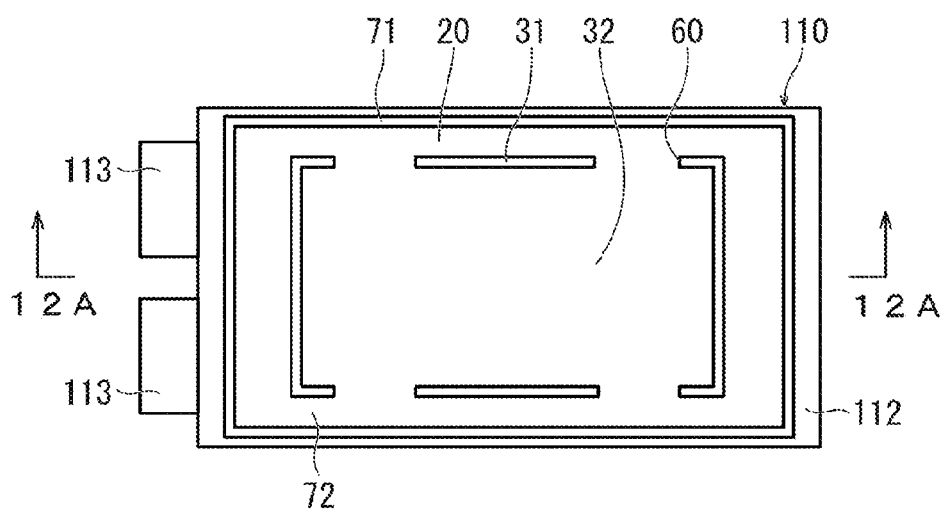
FIG. 11A is a plan view showing a unit cell according to a third embodiment, in which a frame-shaped protruding portion is formed on a main surface.
Figure 11B:
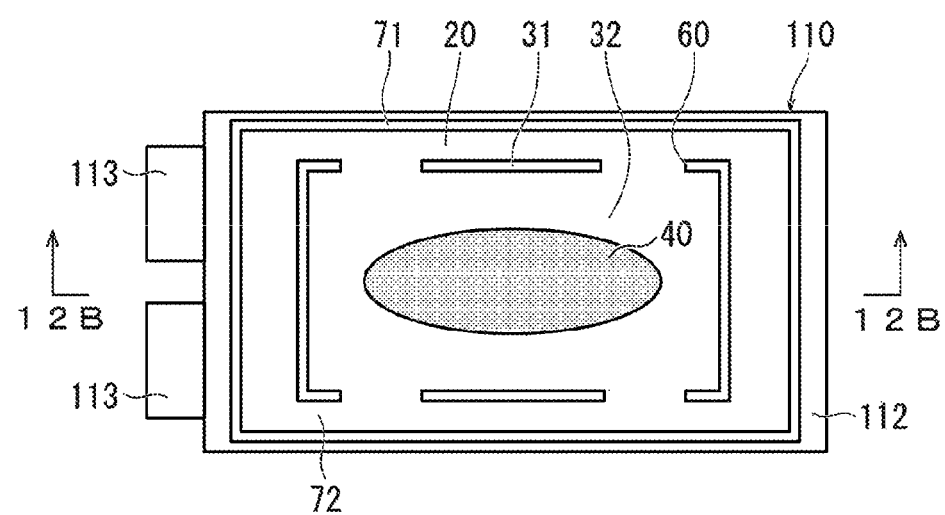
FIG. 11B is a plan view showing a state in which a filler has been applied onto the main surface inside the frame-shaped protruding portion, after the state of FIG. 11A.
Figure 11C:
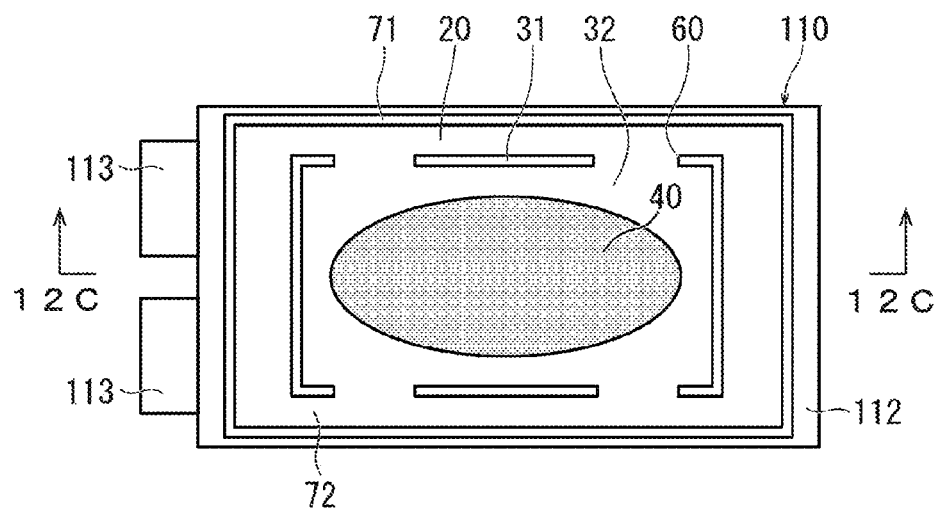
FIG. 11C is a plan view showing a state in which the applied filler has been gradually compressed and spread by stacking the unit cells, after the state of FIG. 11B.
Figure 11D:
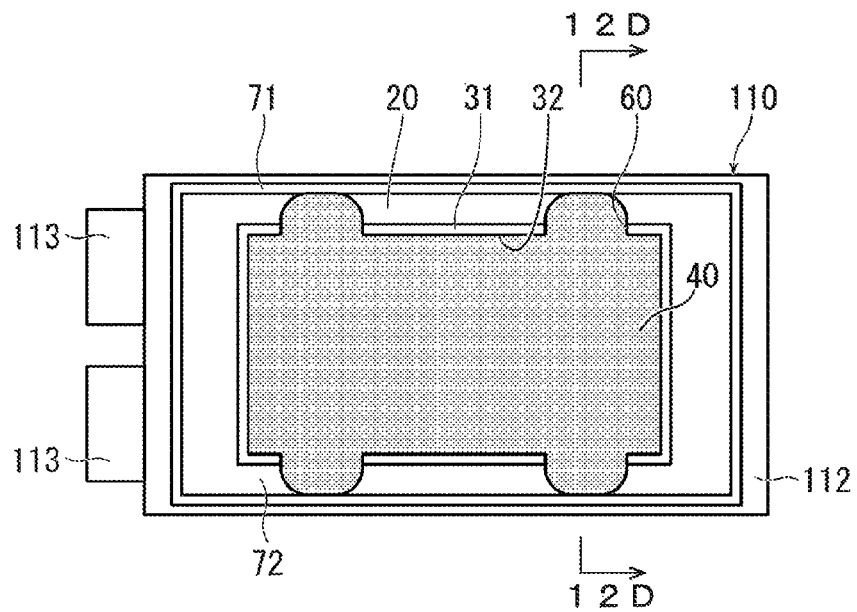
FIG. 11D is a plan view showing a state in which the cell stack has been pressed in the stacking direction, after the state of FIG. 11C.
Figure 12A:
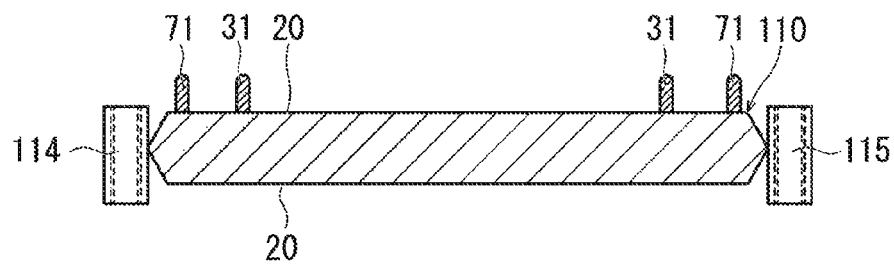
FIG. 12A is a sectional view taken along line 12A-12A in FIG. 11A.
Figure 12B:
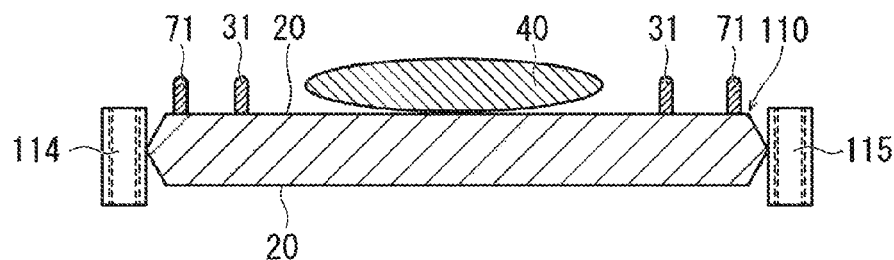
FIG. 12B is a sectional view taken along line 12B-12B in FIG. 11B.
Figure 12C:
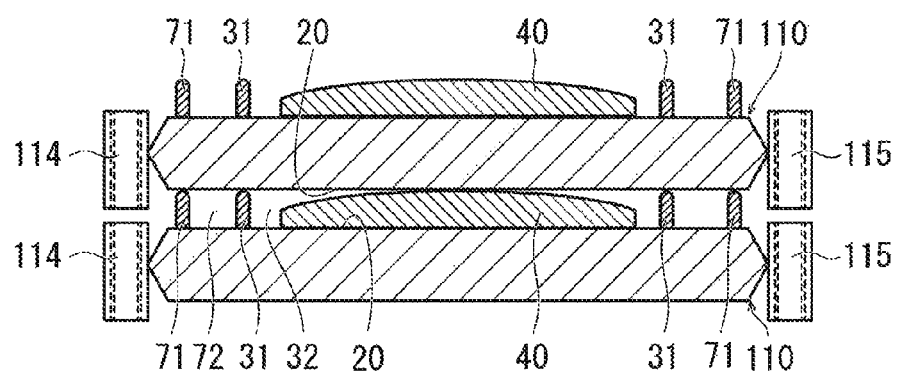
FIG. 12C is a sectional view taken along line 12C-12C in FIG. 11C.
Figure 12D:
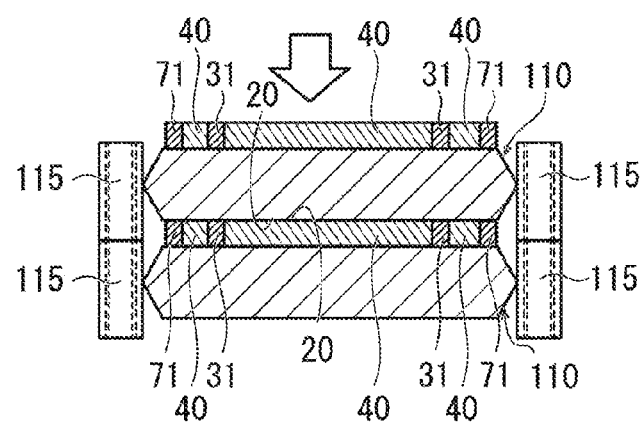
FIG. 12D is a sectional view taken along line 12D-12D in FIG. 11D.

FIG. 11A is a plan view showing a unit cell 110 according to the third embodiment, in which the frame-shaped protruding portion 31 is formed on the main surface 20. FIG. 11B is a plan view showing a state in which the filler 40 is applied onto the main surface 20 inside the frame-shaped protruding portion 31 from the state of FIG. 11A. FIG. 11C is a plan view showing a state in which the applied filler 40 has been gradually compressed and spread by stacking the unit cells 110, after the state of FIG. 11B. FIG. 11D is a plan view showing a state in which the cell stack 110S has been pressed in the stacking direction, after the state of FIG. 11C. FIG. 12A is a sectional view taken along line 12A-12A in FIG. 11A. FIG. 12B is a sectional view taken along line 12B-12B in FIG. 11B. FIG. 12C is a sectional view taken along line 12C-12C in FIG. 11C. FIG. 12D is a sectional view taken along line 12D-12D in FIG. 11D.

The third embodiment is the same as the second embodiment in that communication holes 60 are formed to allow the excess filler 40 to escape when the cell stack 110S is pressed. Furthermore, the third embodiment is the same as the modification of the second embodiment (FIG. 10A) in that the communication holes 60 do not face the electrode terminals 113. The third embodiment is different from the above-described embodiments and modifications in that a protective protruding portion 71 is further formed on the main surface 20 outside the frame-shaped protruding portion 31.

Referring to FIGS. 11A to 11D and FIGS. 12A to 12D, the battery module 100 according to the third embodiment will be generally described. The protective protruding portion 71, which protrudes in the cell thickness direction, extends in the direction having an angle with respect to the opening direction of the communication hole 60, and has a length dimension at least equal to or greater than the opening width dimension of the communication hole 60, is formed on the main surface 20 at a position located outside the frame-shaped protruding portion 31 and spaced apart from the opening of the communication hole 60 in the opening direction of the communication hole 60. As used herein, the phrase "the direction having an angle with respect to the opening direction of the communication hole 60" means that the direction is not parallel to the opening direction of the communication hole 60 but is inclined to intersect the opening direction of the communication holes 60.

The frame-shaped protruding portion 31 has a rectangular shape. The communication holes 60 are opened toward a side that is different from a side from which the electrode terminals 113 are led out (i.e., the left side in FIGS. 11A to 11D). The opening direction of the communication holes 60 on the upper side in the figures is upward, and the opening direction of the communication holes 60 on the lower side in the figures is downward.

The protective protruding portion 71 has a closed rectangular shape to surround the entire outer periphery of the frame-shaped protruding portion 31. The protective protruding portion 71 is formed at a position spaced apart from the openings of the communication holes 60 in the opening direction of the communication holes 60. The protective protruding portion 71 protrudes in the cell thickness direction (see FIGS. 12A to 12D). The protective protruding portion 71 is formed in a frame shape to be opened in the cell thickness direction. The protective protruding portion 71 has a substantially rectangular shape with four sides when viewed from the direction of the main surface 20.

The protective protruding portion 71 has elasticity to be compressed and deformed in the cell thickness direction when the cell stack 110S is pressed from both sides in the stacking direction. The protective protruding portion 71 has a function as a dam or a weir that prevents the excess filler 40 escaping to the outside through the communication holes 60 from leaking to a surface other than the main surface 20. Therefore, the material for forming the protective protruding portion 71 may be a material having elasticity and capable of blocking the filler 40 without passing the filler 40. For example, similarly to the frame-shaped protruding portion 31, the protective protruding portion 71 may be formed from an elastic material such as sponge, rubber, or resin. The protective protruding portion 71 may be formed, for example, by applying a liquid resin material to the main surface 20 of one unit cell 110 in a frame shape and then curing the liquid resin material into a gel state. As the liquid resin material, a one-liquid type material which is cured (into a gel state) by UV irradiation, for example, a UV-curable acrylic resin or a quick-drying material may be used. The liquid resin material may or may not contain an adhesive. In the present embodiment, description will be made, for example, on a case where the protective protruding portion 71 is formed by applying and curing a liquid resin material (into a gel state).

A protective space 72 for accommodating the excess filler 40 is defined by the protective protruding portion 71, the main surface 20 of one unit cell 110, the main surface 20 of another unit cell 110 facing the one unit cell 110 in the stacking direction, and the frame-shaped protruding portion 31 (see FIG. 12C). The protective space 72 is a closed space.

(Method of Manufacturing Battery Module 100)

First, as shown in FIGS. 11A and 12A, prepared is a plurality of unit cells 110 including the frame-shaped protruding portion 31 and the protective protruding portion 71 protruding in the thickness direction from the main surface 20 as a thickness-direction surface and formed in a frame shape to be opened in the thickness direction is prepared. The frame-shaped protruding portion 31 and the protective protruding portion 71 are formed by applying a liquid resin material to the main surface 20 of one unit cell 110 in a frame shape and then curing the liquid resin material. For example, a UV-curable acrylic resin is applied in a frame shape and cured (into a gel state) by UV irradiation, thereby forming the frame-shaped protruding portion 31 and the protective protruding portion 71.

As shown in FIG. 11B, the filler 40 is applied in an elliptical shape on the main surface 20 inside the frame-shaped protruding portion 31.

As shown in FIGS. 11C and 12C, the filler 40 fills the frame-shaped protruding portion's inner space 32 (filling step). The filler 40 is, for example, a two-liquid reactive acrylic anaerobic resin.

A robot sucks and holds an upper cell assembly, transfers the upper cell assembly onto a lower cell assembly, and stacks the upper cell assembly on the lower cell assembly in an aligned state. The robot slightly pushes down the upper cell assembly toward the lower cell assembly to slightly spread the applied filler 40. The filler 40 is compressed to spread to such an extent that the filler 40 comes into contact with the frame-shaped protruding portion 31.

One unit cell 110 is filled with the filler 40 in the frame-shaped protruding portion's inner space 32, and another unit cell 110 is stacked thereon, thereby forming the cell stack 110S such that the main surfaces 20 are opposed to each other.

The cell stack 110S is sandwiched between the upper pressing plate 121 and the lower pressing plate 122, and is pressed from both sides in the stacking direction (pressing step).

As shown in FIGS. 11D and 12D, by pressing the cell stack 110S, the frame-shaped protruding portion 31 is compressed and deformed in the cell thickness direction, and the spacers 114 and 115 adjoining in the stacking direction are brought into close contact with each other. The frame-shaped protruding portion 31 has a function of, when compressed, limiting a range in which the filler 40 spreads. The filled filler 40 generates a pressing force against the unit cell 110, i.e., a reaction force applied to the unit cell 110 from the filler 40, in the frame-shaped protruding portion's inner space 32 which is a closed space. The excess filler 40 is accommodated in the protective space 72 through the communication holes 60. After the cell stack 110S is produced, the filler 40 is cured (into a gel state). When the filler 40 is cured, its spreading has already been completed. Thus, the thickness of the filler 40 in the unit cell stacking direction does not decrease. For this reason, the reaction force from the filler 40 to the unit cell 110 does not decrease. As a result, when the battery module 100 is used, the pressing force is reliably applied to the unit cell 110.

Since the protective space 72 is a closed space, it is possible to prevent the filler 40, which escapes from the communication holes 60 to the outside of the frame-shaped protruding portion's inner space 32, from adhering to and contaminating the electrode terminals 113 or peripheral production facilities. In the above embodiment, an example has been described in which the protective space 72 is formed as a closed space by continuously forming the protective protruding portion 71. However, the present disclosure is not limited thereto. The protective protruding portion 71 may be a length at least equal to or greater than the opening width of the communication holes 60, and may be provided in the opening direction of the communication hole 60 (in the direction extending along the main surface of the unit cell 110 and outside the communication holes 60). The length of the protective protruding portion 71 may be appropriately changed depending on the amount of the filler 40 flowing from the communication hole 60 to the outside of the frame-shaped protruding portion's inner space 32.

(Modification of Shape of Protective Protruding Portion 71 According to Third Embodiment)

Figure 13A:
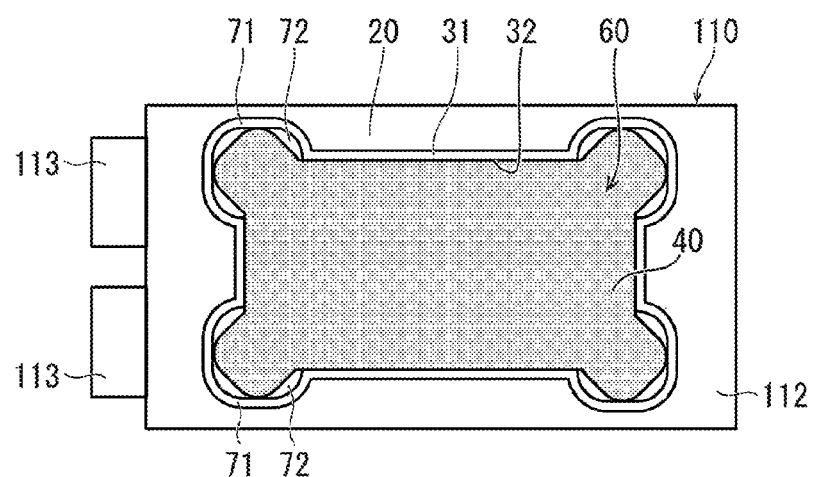
FIG. 13A is a plan view showing a modification of a shape of a protective protruding portion according to the third embodiment.
Figure 13B:
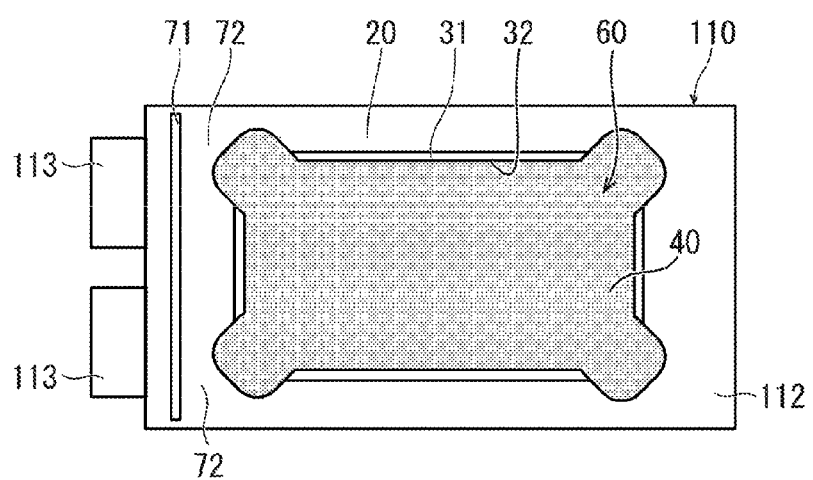
FIG. 13B is a plan view showing another modification of the shape of the protective protruding portion according to the third embodiment.

FIGS. 13A and 13B are plan views showing modifications of the shape of the protective protruding portion 71.

Referring to FIG. 13A, the unit cell 110 of the modification is provided with communication holes 60 opened diagonally outward at the respective corners of the frame-shaped protruding portion 31. The protective protruding portion 71 is also formed on the main surface 20 outside the frame-shaped protruding portion 31 at a position spaced apart from the openings of the communication holes 60 in the opening direction of the communication holes 60. The protective protruding portion 71 protrudes in the cell thickness direction, extends in a direction having an angle with respect to the opening direction of the communication holes 60, and has a length at least equal to or greater than the opening width of the communication holes 60. The protective protruding portion 71 of this modification is different from that of the third embodiment in that the protective protruding portion 71 is formed continuously with the frame-shaped protruding portion 31 and is formed to independently surround the respective communication holes 60.

Referring to FIG. 13B, the unit cell 110 of the modification has the shape of a bank arranged between the electrode terminals 113 and the left side of the frame-shaped protruding portion 31 in the figure. The difference from the third embodiment or the above modification is that the protective space 72 is not closed. Although the protective space 72 in this case is not a closed space, it is possible to prevent the filler 40 escaped from the communication holes 60 from adhering to the electrode terminals 113.

As described above, according to the respective embodiments and the respective modifications, the following operations and effects may be obtained.

The battery module 100 includes the filler 40 filling the frame-shaped protruding portion's inner space 32, which is defined by the frame-shaped protruding portion 31, the main surface 20 of one unit cell 110, and the main surface 20 of another unit cell 110 facing the one unit cell 110 in the stacking direction. The volume of the filler 40, which fills the frame-shaped protruding portion's inner space 32, under the atmospheric pressure is larger than the volume of the frame-shaped protruding portion's inner space 32 when the cell stack 110S is pressed.

With such a configuration, the frame-shaped protruding portion 31 has a function of, when compressed, limiting the range in which the filler 40 spreads. The filled filler 40 generates a pressing force against the unit cell 110, i.e., a reaction force applied to the unit cell 110 from the filler 40, in the frame-shaped protruding portion's inner space 32 which is a closed space. When the filler 40 is cured, its spreading has already been completed. Thus, the thickness of the filler 40 in the unit cell stacking direction does not decrease. For this reason, the reaction force from the filler 40 to the unit cell 110 does not decrease. As a result, when the battery module 100 is used, the pressing force is reliably applied to the unit cell 110.

The filler 40 may be an adhesive that bonds the main surface 20 of one unit cell 110 to the main surface 20 of another unit cell 110.

With such a configuration, a necessary area as an adhesive layer may be secured by the filler 40 as an adhesive.

The material for forming the frame-shaped protruding portion 31 may be an adhesive that bonds the main surface 20 of one unit cell 110 to the main surface 20 of another unit cell 110.

With such a configuration, a necessary area as an adhesive layer may be secured by the frame-shaped protruding portion 31 as an adhesive.

The frame-shaped protruding portion 31 is provided with the communication holes 60 opened in the direction parallel to the main surface 20 to bring the frame-shaped protruding portion's inner space 32 into communication with the outside of the frame-shaped protruding portion 31.

By providing the communication holes 60 in this manner, the initial surface pressure may be kept low at the initial stage of pressing the cell stack 110S.

The communication holes 60 are opened toward a side that is different from a side from which the electrode terminals 113 are led out (i.e., the left side in FIG. 10A).

With such a configuration, the communication holes 60 do not face the electrode terminals 113. As a result of an increase in the distance between the electrode terminals 113 and the communication holes 60, it is possible to prevent the filler 40, which escapes from the communication holes 60, from adhering to the electrode terminals 113.

The communication holes 60 may be formed at symmetrical positions with respect to the straight lines 34a and 34b extending in the direction parallel to the main surface 20 through the center 33 of the region surrounded by the frame-shaped protruding portion 31 (see FIG. 9A).

With such a configuration, the excess filler 40 may escape from the symmetrically-arranged communication holes 60, and a uniform surface pressure may be applied to the unit cell 110.

In the battery module 100, the protective protruding portion 71, which protrudes in the cell thickness direction, extends in the direction having an angle with respect to the opening direction of the communication hole 60, and has a length dimension at least equal to or greater than the opening width dimension of the communication hole 60, is formed on the main surface 20 at a position located outside the frame-shaped protruding portion 31 and spaced apart from the opening of the communication hole 60 in the opening direction of the communication hole 60.

With such a configuration, it is possible for the protective protruding portion 71 to prevent the filler 40, which escape from the communication hole 60, from adhering to and contaminating the electrode terminals 113 or peripheral production facilities.

The frame-shaped protruding portion 31 may be formed by four protruding portions each having a linear shape when viewed from the direction of the main surface 20, and at least both ends of each of the four protruding portions may be formed in a curved shape.

With such a configuration, the filler 40 changes its spreading direction and tends to spread evenly over the entire region inside the frame-shaped protruding portion 31. This makes it possible to prevent the filler 40 from locally making contact with the frame-shaped protruding portion 31, and to uniformly fill the frame-shaped protruding portion's inner space 32 with the filler 40.

The frame-shaped protruding portion 31 may be formed by a protruding portion having an elliptical shape when viewed from the direction of the main surface 20.

With such a configuration, the frame-shaped protruding portion 31 does not have a linear portion. Therefore, the filler 40 changes its spreading direction and spreads more evenly over the entire region inside the frame-shaped protruding portion 31. This makes it possible to prevent the filler 40 from locally making contact with the frame-shaped protruding portion 31, and to uniformly fill the frame-shaped protruding portion's inner space 32 with the filler 40.

The position of the frame-shaped protruding portion 31 is located outside the cell-pressing projection region 21.

With such a configuration, the cell-pressing projection region 21 is filled with the filler 40. Therefore, the unit cell 110 does not have a large distance between the electrode plates, and does not cause a decrease in cell performance.

In the method of manufacturing the battery module, the filler 40, which is a fluid having a volume larger than the volume of the frame-shaped protruding portion's inner space 32, fills the frame-shaped protruding portion's inner space 32 (filling step). The cell stack 110S is formed, and the cell stack 110S is pressed from both sides in the stacking direction (pressing step).

With such a configuration, the frame-shaped protruding portion 31 has a function of, when compressed, limiting the range in which the filler 40 spreads. The filled filler 40 generates a pressing force against the unit cell 110, i.e., a reaction force applied to the unit cell 110 from the filler 40, in the frame-shaped protruding portion's inner space 32 which is a closed space. When the filler 40 is cured, the spreading thereof has already been completed. Thus, the thickness of the filler 40 in the unit cell stacking direction does not decrease. For this reason, the reaction force from the filler 40 to the unit cell 110 does not decrease. As a result, it is possible to manufacture the battery module 100 capable of reliably applying a pressing force to the unit cell 110.

The frame-shaped protruding portion 31 may be formed by applying a liquid resin material to the main surface 20 of one unit cell 110 in a frame shape and then curing the liquid resin material.

With such a configuration, it is possible to continuously and easily form the frame-shaped protruding portion 31.

The frame-shaped protruding portion 31 may be formed by intermittently applying a liquid resin material to the main surface 20 of a certain unit cell 110 in a frame shape and then curing the liquid resin material.

With such a configuration, by intermittently applying the liquid resin material for the frame-shaped protruding portion 31, the communication hole 60 may be formed with ease. In the filling step, the fluid that fills the frame-shaped protruding portion's inner space 32 may be a plastic fluid (Bingham fluid).

The Bingham fluid is a fluid that does not begin to flow unless a certain shear stress is reached. Therefore, an initial surface pressure may be easily generated by pressing.

The fluid filling the frame-shaped protruding portion's inner space 32 in the filling step is an adhesive that is cured after the pressing step to bond the main surface 20 of one unit cell 110 to the main surface 20 of another unit cell 110.

With such a configuration, a necessary area for an adhesive layer may be secured by the fluid as an adhesive filled in the frame-shaped protruding portion's inner space 32.

(Other Modifications)

The present disclosure is not limited to the above-described embodiments and modifications, and may be appropriately modified.

Figure 14A:
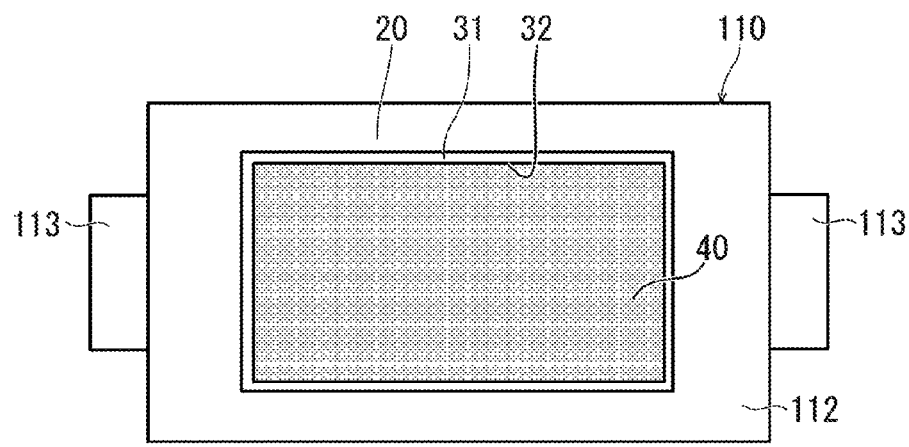
FIG. 14A is a plan view showing a unit cell in which electrode terminals are led out from two opposing sides of an exterior material.
Figure 14B:
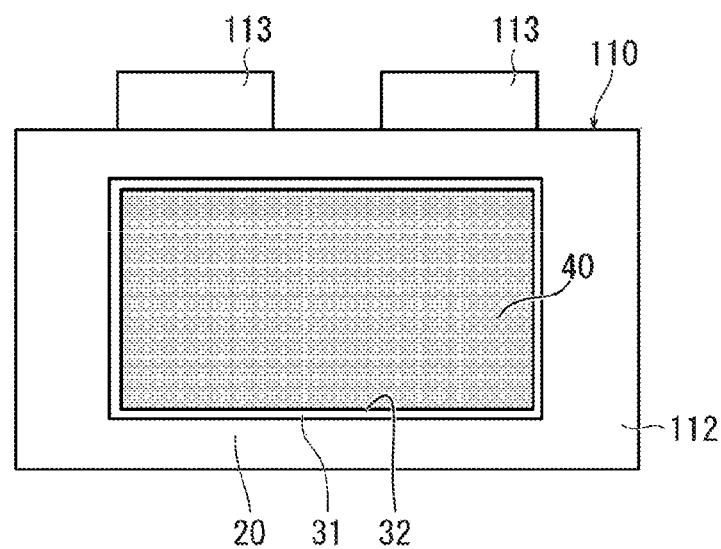
FIG. 14B is a plan view showing a unit cell in which electrode terminals are led out from a long side end.

For example, the present disclosure may also be applied to a unit cell 110 in which as shown in FIG. 14A, electrode terminals 113 are led out from two opposite sides of an exterior material. In addition, the present disclosure may also be applied to a unit cell 110 in which as shown in FIG. 14B, electrode terminals 113 are led out from a long side end portion.

Although description has been made by taking the example of the plate-shaped cell in which the frame-shaped protruding portion 31 is formed on the main surface, the present disclosure may also be applied to a plate-shaped cell in which a frame-shaped protruding portion is formed in advance on a main surface. For example, the present disclosure may also be applied to a rectangular cell in which an outer body is a metal can and in which a frame-shaped rib is provided on the metal can itself. Therefore, in the method of manufacturing a battery module according to the present disclosure, the step of forming the frame-shaped protruding portion 31 is not an essential step.

Furthermore, although there has been described by way of example the embodiment in which the frame-shaped protruding portion 31 and the protective protruding portion 71 are formed by applying the liquid resin material to the main surface 20 of the unit cell 110 in a frame shape has been described as an example, the method of forming the frame-shaped protruding portion 31 or the protective protruding portion 71 is not limited thereto. For example, a frame-shaped protruding portion 31 or a protective protruding portion 71 formed in a frame shape in advance may be provided on or attached to the main surface 20 of the unit cell 110.

EXPLANATION OF REFERENCE NUMERALS

20: main surface, 21: cell-pressing projection region, 31: frame-shaped protruding portion, 32: frame-shaped protruding portion's inner space, 33: center, 34a: straight line, 34b: straight line, 40: filler, 41: rectangular region, 42: center, 60: communication hole, 60a: first communication hole, 60b: second communication hole, 60c: third communication hole, 60d: fourth communication hole, 71: protective protruding portion, 72: protective space, 100: battery module, 110: unit cell (plate-shaped cell), 110H: main body portion, 110S: cell stack, 111: power generation element, 112: laminate film (exterior body), 113: electrode terminal, 113A: anode-side electrode terminal, 113K: cathode-side electrode terminal, 114: first spacer, 115: second spacer, 132: bus bar

What is claimed is:

1. A battery module including a cell stack in which a plurality of plate-shaped cells is stacked such that each main surface, which is a surface of each of the plate-shaped cells in a cell thickness direction, faces one another, the battery module comprising:
   a frame-shaped protruding portion that is formed on a main surface of one plate-shaped cell among the plurality of plate-shaped cells, protrudes from the main surface of the one plate-shaped cell in the cell thickness direction, and is formed in a frame shape that is opened in the cell thickness direction; and
   a filler that fills an inner space of the frame-shaped protruding portion, the inner space being defined by the frame-shaped protruding portion, the main surface of the one plate-shaped cell, and a main surface of another plate-shaped cell facing the one plate-shaped cell in a stacking direction among the plurality of plate-shaped cells, wherein:
   the filler is a plastic fluid having fluidity at least when pressurized,
   the one plate-shaped cell and the another plate-shaped cell are connected to spacers, respectively, and
   as the spacers adjoin to be brought into close contact with each other, the filler is compressed by the one plate-shaped cell and the another plate-shaped cell to have fluidity, and then is cured into a gel state to apply a pressing force to the one plate-shaped cell and to the another plate-shaped cell,
   wherein a protective protruding portion is formed on the main surface at a position located outside the frame-shaped protruding portion.

2. The battery module of claim 1, wherein the filler further includes an adhesive configured to bond the main surface of the one plate-shaped cell to the main surface of the another plate-shaped cell.

3. The battery module of claim 1, wherein a material for forming the frame-shaped protruding portion is an adhesive configured to bond the main surface of the one plate-shaped cell to the main surface of the another plate-shaped cell.

4. The battery module of claim 1, wherein the frame-shaped protruding portion is formed by four protruding portions each having a linear shape when viewed from a direction of the main surface, and at least both ends of each of the four protruding portions are formed in a curved shape.

5. The battery module of claim 1, wherein the frame-shaped protruding portion is formed by a protruding portion having an elliptical shape when viewed from a direction of the main surface.

6. The battery module of claim 1, wherein a position of the frame-shaped protruding portion is located outside a cell-pressing projection region.

7. A method of manufacturing the battery module of claim 1, comprising:
   preparing a plurality of plate-shaped cells each including a frame-shaped protruding portion, which protrudes from each main surface that is a thickness-direction surface in a thickness direction and is formed in a frame shape opened in the thickness direction;
   filling an inner space of the frame-shaped protruding portion with a filler that is a fluid, the inner space being defined by the frame-shaped protruding portion, a main surface of one plate-shaped cell, and a main surface of another plate-shaped cell facing the one plate-shaped cell in a stacking direction;
   forming a cell stack by stacking the another plate-shaped cell on the one plate-shaped cell having the inner space of the frame-shaped protruding portion filled with the filler such that the main surfaces face each other; and
   pressing the cell stack from both sides in the stacking direction.

8. The method of claim 7, wherein the frame-shaped protruding portion is formed by applying a liquid resin material onto the main surface of the one plate-shaped cell in a frame shape and then curing the liquid resin material.

9. The method of claim 7, wherein the frame-shaped protruding portion is formed by intermittently applying a liquid resin material onto the main surface of the one plate-shaped cell in a frame shape and then curing the liquid resin material.

10. The method of claim 7, wherein in the act of filling, the fluid, which fills the inner space of the frame-shaped protruding portion, is a plastic fluid.

11. The method of claim 7, wherein in the act of filling, the fluid, which fills the inner space of the frame-shaped protruding portion, is an adhesive that is cured after the act of pressing to bond the main surface of the one plate-shaped cell to the main surface of the another plate-shaped cell.

12. The battery module of claim 5, wherein the cell-pressing projection region is filled with the filler.

13. The battery module of claim 1, wherein the frame-shaped protruding portion is provided with a communication hole opened in a direction parallel to the main surface and configured to bring the inner space of the frame-shaped protruding portion into communication with an outside of the frame-shaped protruding portion.

14. The battery module of claim 13, wherein:
the plate-shaped cells have a substantially rectangular shape with four sides when viewed from a direction of the main surface,
a power generation element formed by stacking electrode plates is accommodated inside an exterior body of each of the plate-shaped cells,
an electrode terminal of each of the plate-shaped cells is connected to the power generation element inside the exterior and is led out from one side of the four sides to the outside of the exterior body, and
the communication hole is opened toward a side that is different from the side from which the electrode terminal is led out.

15. The battery module of claim 13, wherein the communication hole includes a plurality of communication holes formed at symmetrical positions with respect to a straight line extending in the direction parallel to the main surface through a center of a region surrounded by the frame-shaped protruding portion.

16. The battery module of claim 14, wherein the frame-shaped protruding portion is formed by applying a liquid resin material onto the main surface of the one plate-shaped cell in a frame shape and then curing the liquid resin material.

17. The battery module of claim 13, wherein the communication hole includes a plurality of communication holes, and the plurality of communication holes includes a first communication hole formed on an upper side of the frame-shaped protruding portion, a second communication hole formed on a lower side of the frame-shaped protruding portion, a third communication hole and a fourth communication hole formed on a left side of the frame-shaped protruding portion.

18. The battery module of claim 15, wherein the communication hole includes a plurality of communication holes, and the plurality of communication holes includes a first communication hole and a second communication hole formed at symmetrical positions with respect to the straight line and a third communication hole and a fourth communication hole formed at symmetric positions with respect to the straight line.

19. The battery module of claim 13, wherein the communication hole includes a plurality of communication holes opened diagonally outward at respective corners of the frame-shaped protruding portion.

* * * * *

UNITED STATES PATENT AND TRADEMARK OFFICE
CERTIFICATE OF CORRECTION

PATENT NO. : 12,355,038 B2  
APPLICATION NO. : 16/976734  
DATED : July 8, 2025  
INVENTOR(S) : Manabu Fukuoka et al.

Page 1 of 1

It is certified that error appears in the above-identified patent and that said Letters Patent is hereby corrected as shown below:

On the Title Page

Item (71):  
"Envision AESC Japan Ltd., Kanagawa (JP)"  
Should read:  
--AESC Japan Ltd., Kanagawa (JP)--

Signed and Sealed this  
Nineteenth Day of August, 2025

Coke Morgan Stewart  
*Acting Director of the United States Patent and Trademark Office*